(12) United States Patent
Oteki

(10) Patent No.: US 8,174,732 B2
(45) Date of Patent: May 8, 2012

(54) APPARATUS, METHOD, AND COMPUTER PROGRAM PRODUCT FOR PROCESSING IMAGE

(75) Inventor: Sugitaka Oteki, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 809 days.

(21) Appl. No.: 12/268,597

(22) Filed: Nov. 11, 2008

(65) Prior Publication Data

US 2009/0122361 A1    May 14, 2009

(30) Foreign Application Priority Data

Nov. 12, 2007 (JP) ................................ 2007-293164
Oct. 20, 2008 (JP) ................................ 2008-270137

(51) Int. Cl.
*H04N 1/409* (2006.01)
*G06K 9/40* (2006.01)

(52) U.S. Cl. ...................................... 358/3.26; 382/275

(58) Field of Classification Search ................. 358/3.26; 382/275

See application file for complete search history.

(56) References Cited

U.S. PATENT DOCUMENTS

| | | | | |
|---|---|---|---|---|
| 5,223,954 A | * | 6/1993 | Miyakawa et al. | 358/474 |
| 6,421,146 B1 | * | 7/2002 | Yoo | 358/461 |
| 6,763,473 B1 | | 7/2004 | Oteki et al. | |
| 7,123,385 B2 | | 10/2006 | Oteki et al. | |
| 7,218,425 B2 | * | 5/2007 | Saida et al. | 358/437 |
| 2003/0174354 A1 | | 9/2003 | Oteki | |
| 2008/0252941 A1 | * | 10/2008 | Hashizume | 358/474 |

FOREIGN PATENT DOCUMENTS

| | | |
|---|---|---|
| JP | 2001-238050 | 8/2001 |
| JP | 2002-109527 | 4/2002 |
| JP | 2003-134304 | 5/2003 |
| JP | 3667238 | 4/2005 |
| JP | 2005-311841 | 11/2005 |
| JP | 2006-87053 | 3/2006 |
| JP | 2007-82033 | 3/2007 |

* cited by examiner

*Primary Examiner* — Charlotte M Baker
(74) *Attorney, Agent, or Firm* — Oblon, Spivak, McClelland, Maier & Neustadt, L.L.P.

(57) ABSTRACT

A white reference member is used to obtain white reference data. An image sensor scans the white reference member line by line to obtain a plurality of lines of white reference data. A skipping unit skips the white reference data with a predetermined skipping ratio to generate a skipped white reference data. A dust detecting unit detects a dust between the white reference member and the image sensor based on the skipped white reference data.

11 Claims, 42 Drawing Sheets

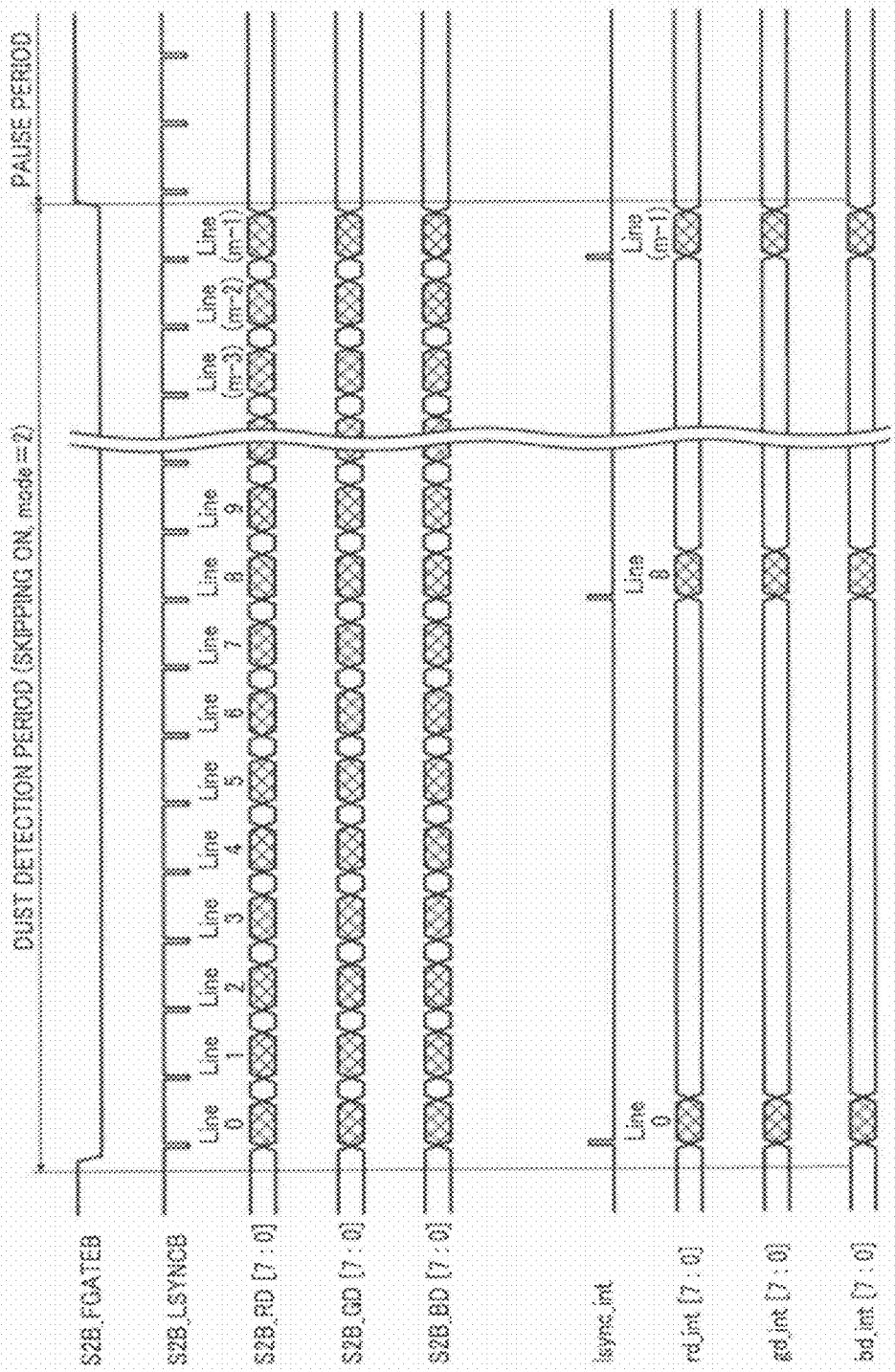

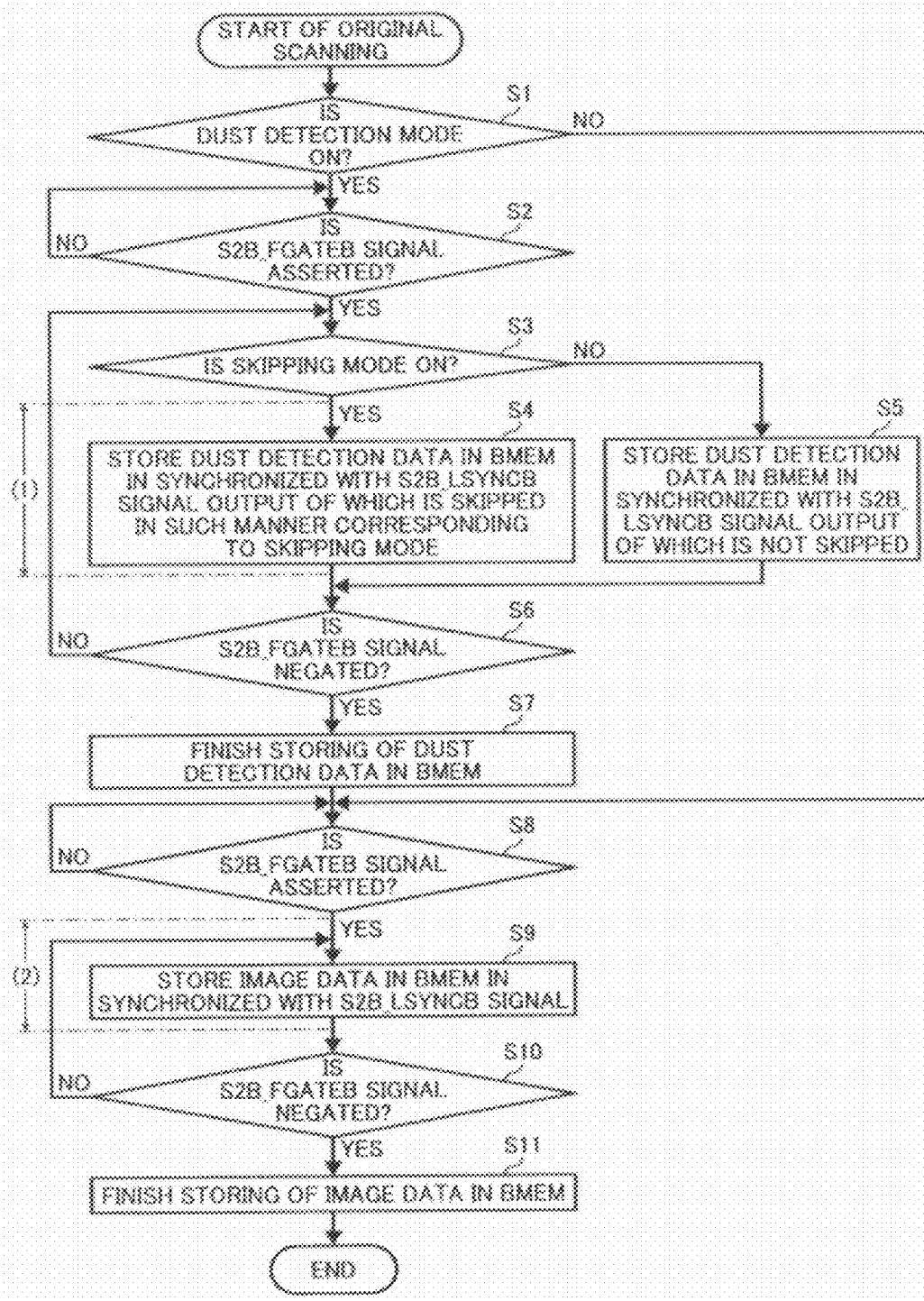

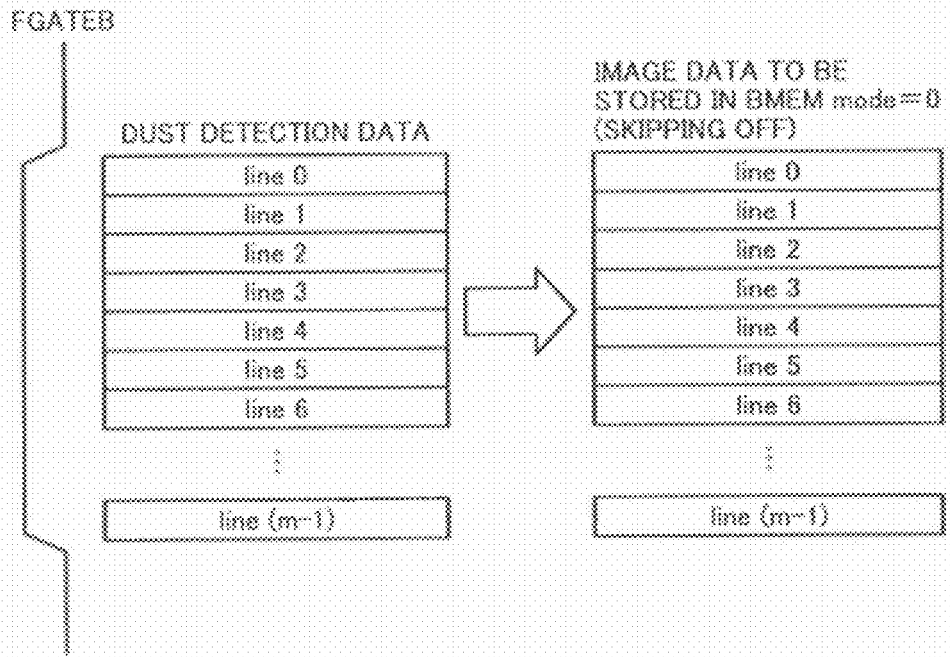
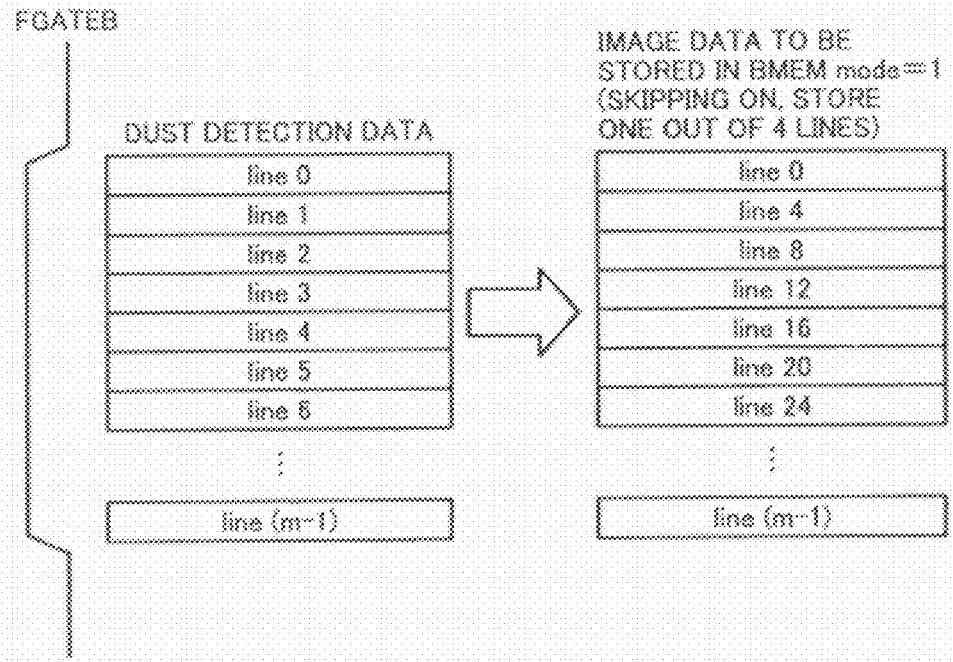

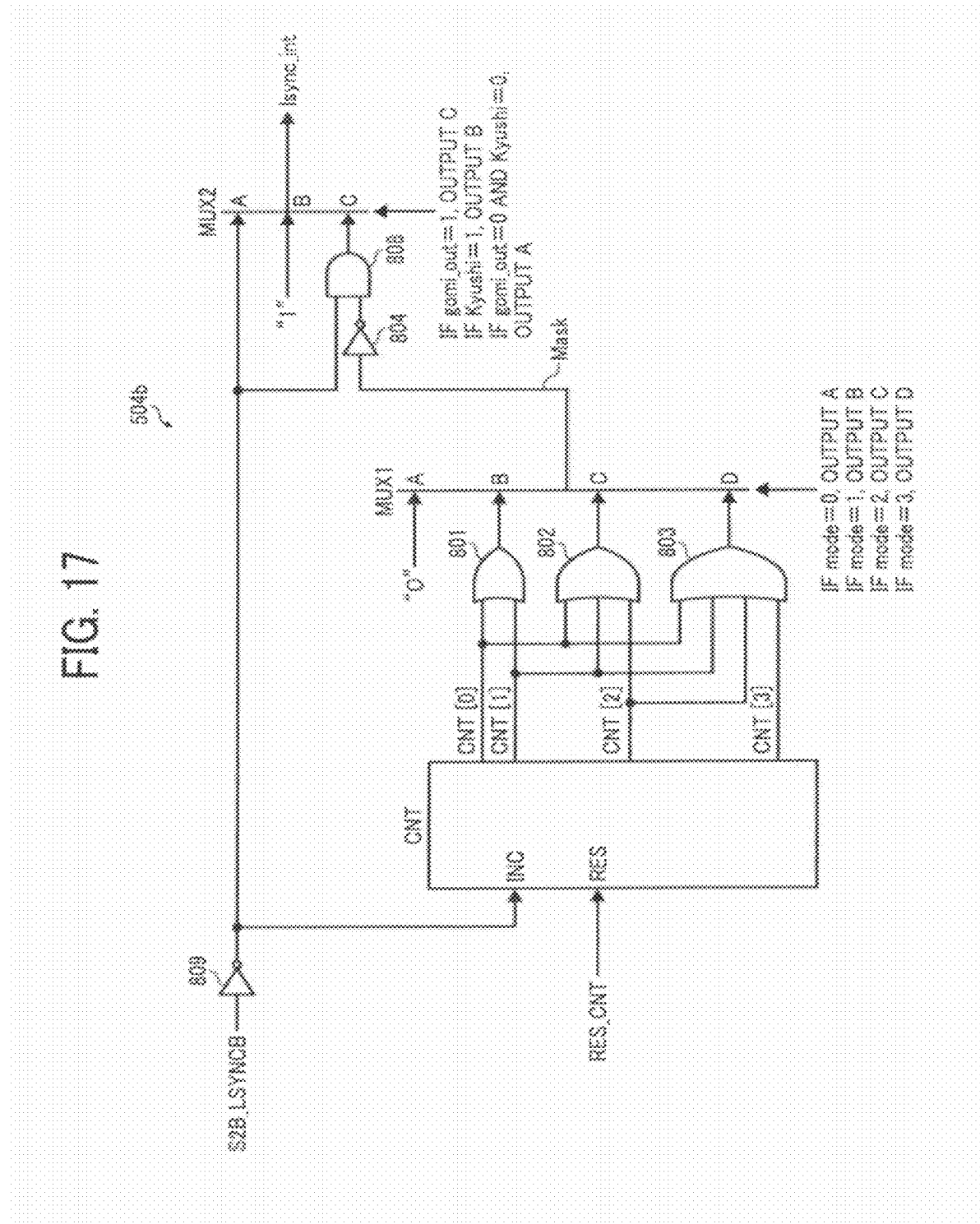

FIG. 18

| LINE NO. | CNT VALUE | | mode=0 MASK SIGNAL IN SKIPPING OFF | mode=1 MASK SIGNAL IN SKIPPING ON/STORE ONE OUT OF 4 LINES | mode=2 MASK SIGNAL IN SKIPPING ON/STORE ONE OUT OF 8 LINES | mode=3 MASK SIGNAL IN SKIPPING ON/STORE ONE OUT OF 16 LINES |
|---|---|---|---|---|---|---|
| | DECIMAL NUMBER | BINARY NUMBER [3] [2] [1] [0] | | | | |
| Line 0 | 0 | 0 0 0 0 | 0 | 0 | 0 | 0 |
| Line 1 | 1 | 0 0 0 1 | 0 | 1 | 1 | 1 |
| Line 2 | 2 | 0 0 1 0 | 0 | 1 | 1 | 1 |
| Line 3 | 3 | 0 0 1 1 | 0 | 1 | 1 | 1 |
| Line 4 | 4 | 0 1 0 0 | 0 | 0 | 1 | 1 |
| Line 5 | 5 | 0 1 0 1 | 0 | 1 | 1 | 1 |
| Line 6 | 6 | 0 1 1 0 | 0 | 1 | 1 | 1 |
| Line 7 | 7 | 0 1 1 1 | 0 | 1 | 1 | 1 |
| Line 8 | 8 | 1 0 0 0 | 0 | 0 | 0 | 1 |
| Line 9 | 9 | 1 0 0 1 | 0 | 1 | 1 | 1 |
| Line 10 | 10 | 1 0 1 0 | 0 | 1 | 1 | 1 |
| Line 11 | 11 | 1 0 1 1 | 0 | 1 | 1 | 1 |
| Line 12 | 12 | 1 1 0 0 | 0 | 0 | 1 | 1 |
| Line 13 | 13 | 1 1 0 1 | 0 | 1 | 1 | 1 |
| Line 14 | 14 | 1 1 1 0 | 0 | 1 | 1 | 1 |
| Line 15 | 15 | 1 1 1 1 | 0 | 1 | 1 | 1 |
| Line 16 | 0 | 0 0 0 0 | 0 | 0 | 0 | 0 |
| Line 17 | 1 | 0 0 0 1 | 0 | 1 | 1 | 1 |
| Line 18 | 2 | 0 0 1 0 | 0 | 1 | 1 | 1 |
| Line 19 | 3 | 0 0 1 1 | 0 | 1 | 1 | 1 |
| Line 20 | 4 | 0 1 0 0 | 0 | 0 | 1 | 1 |
| Line 21 | 5 | 0 1 0 1 | 0 | 1 | 1 | 1 |
| Line 22 | 6 | 0 1 1 0 | 0 | 1 | 1 | 1 |
| Line 23 | 7 | 0 1 1 1 | 0 | 1 | 1 | 1 |
| Line 24 | 8 | 1 0 0 0 | 0 | 0 | 0 | 1 |
| Line 25 | 9 | 1 0 0 1 | 0 | 1 | 1 | 1 |
| Line 26 | 10 | 1 0 1 0 | 0 | 1 | 1 | 1 |
| Line 27 | 11 | 1 0 1 1 | 0 | 1 | 1 | 1 |
| Line 28 | 12 | 1 1 0 0 | 0 | 0 | 1 | 1 |
| Line 29 | 13 | 1 1 0 1 | 0 | 1 | 1 | 1 |
| Line 30 | 14 | 1 1 1 0 | 0 | 1 | 1 | 1 |
| Line 31 | 15 | 1 1 1 1 | 0 | 1 | 1 | 1 |
| Line 32 | 0 | 0 0 0 0 | 0 | 0 | 0 | 0 |
| Line 33 | 1 | 0 0 0 1 | 0 | 1 | 1 | 1 |
| ⋮ | ⋮ | ⋮ | ⋮ | ⋮ | ⋮ | ⋮ |

FIG. 24

| No. | SCANNING RESOLUTION | mode | SKIPPING MODE ON/OFF | SKIPPING RATIO WHEN SKIPPING MODE ON |
|---|---|---|---|---|
| 1 | 100 [dpi] | mode=0 | OFF | — |
| 2 | 200 [dpi] | mode=0 | OFF | — |
| 3 | 300 [dpi] | mode=1 | ON | STORE ONE OUT OF 4 LINES |
| 4 | 400 [dpi] | mode=1 | ON | STORE ONE OUT OF 4 LINES |
| 5 | 600 [dpi] | mode=2 | ON | STORE ONE OUT OF 8 LINES |
| 6 | 1200 [dpi] | mode=3 | ON | STORE ONE OUT OF 16 LINES |

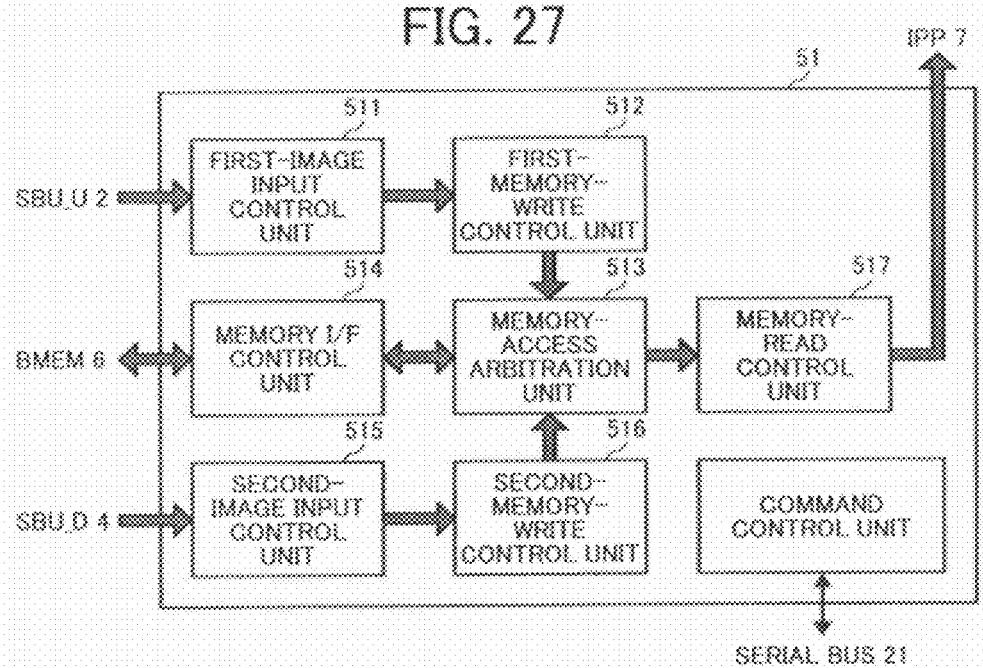
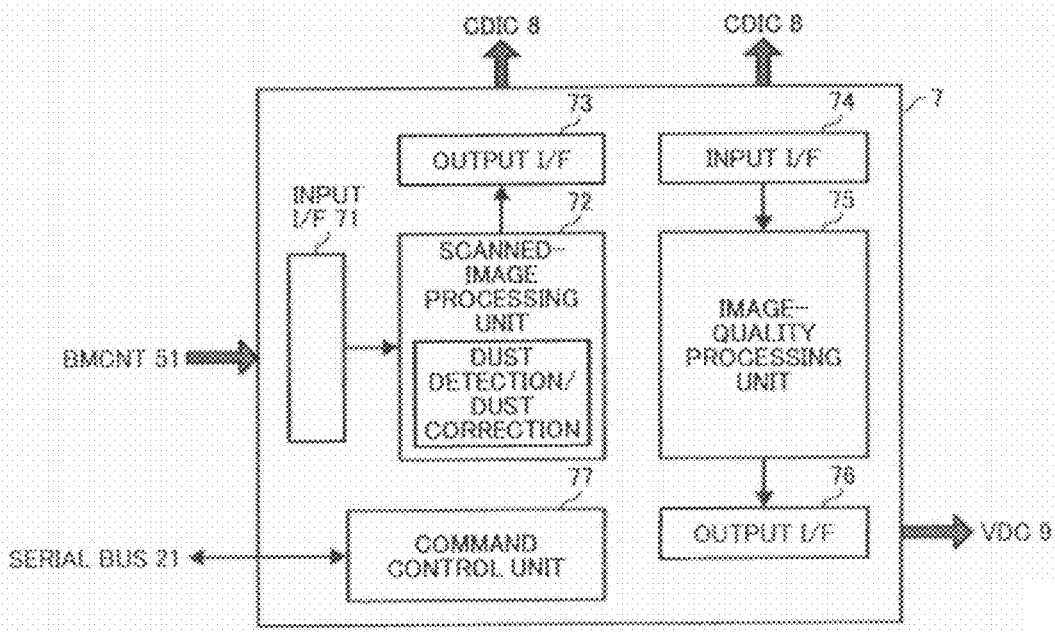

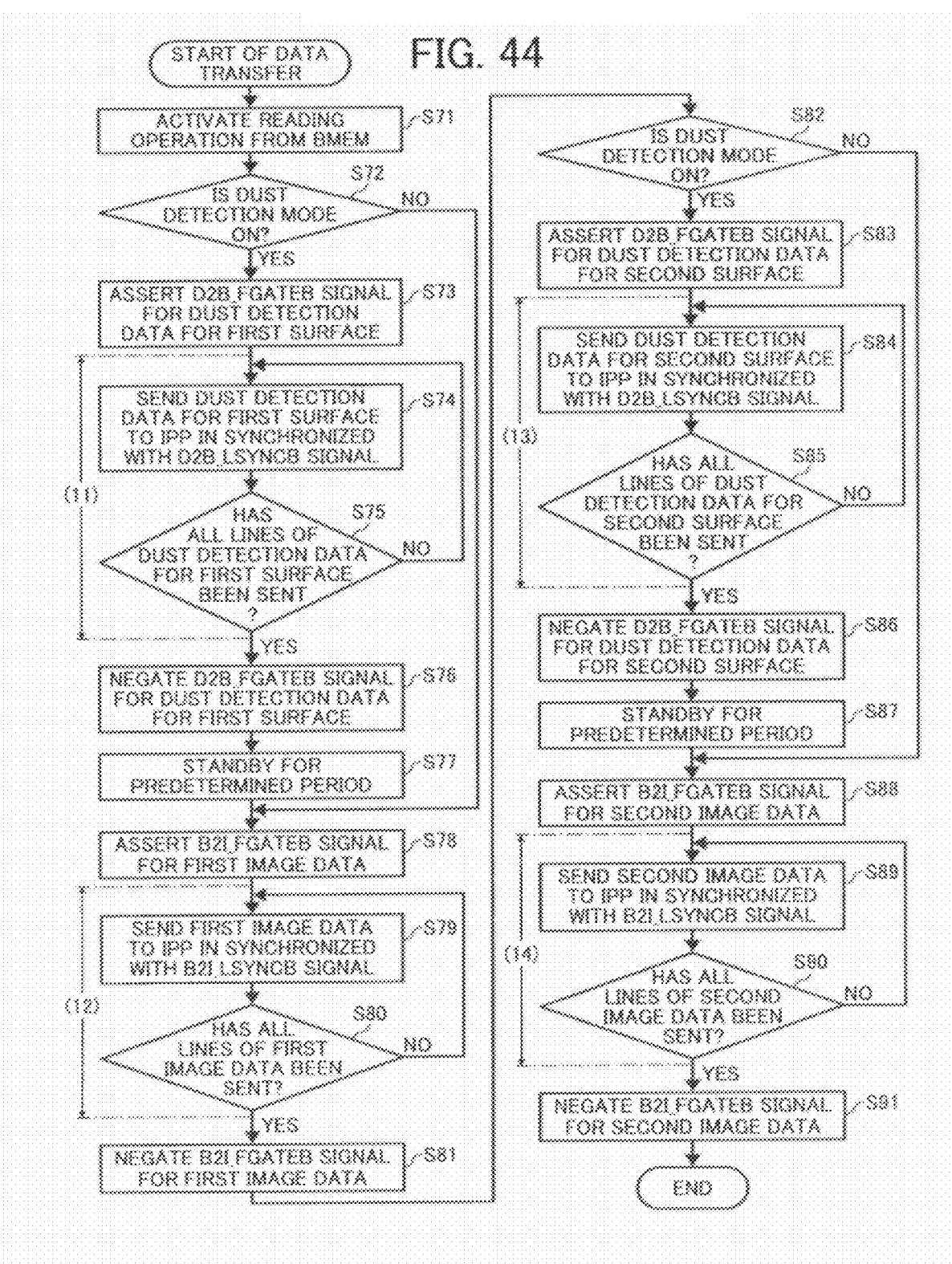

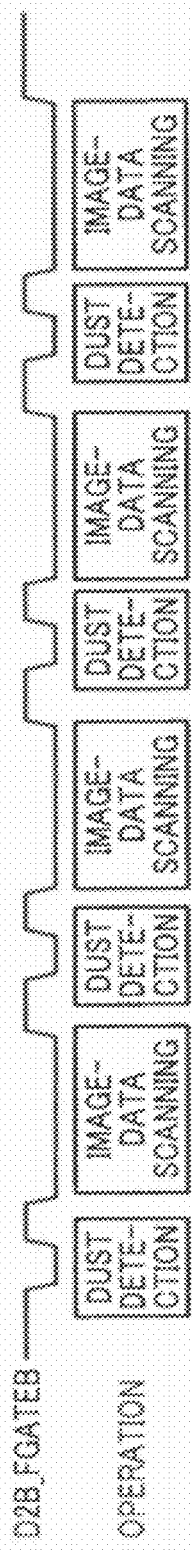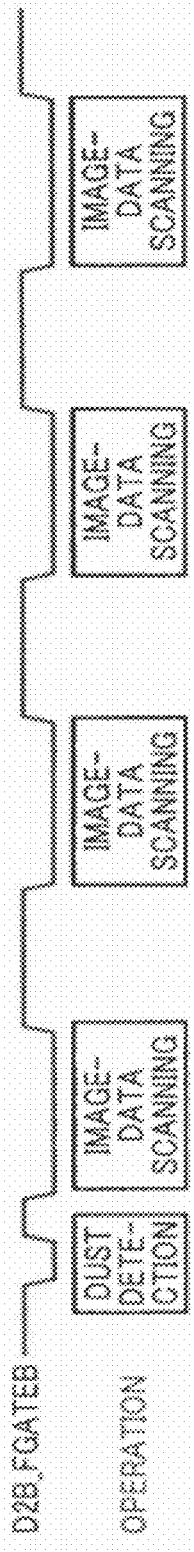

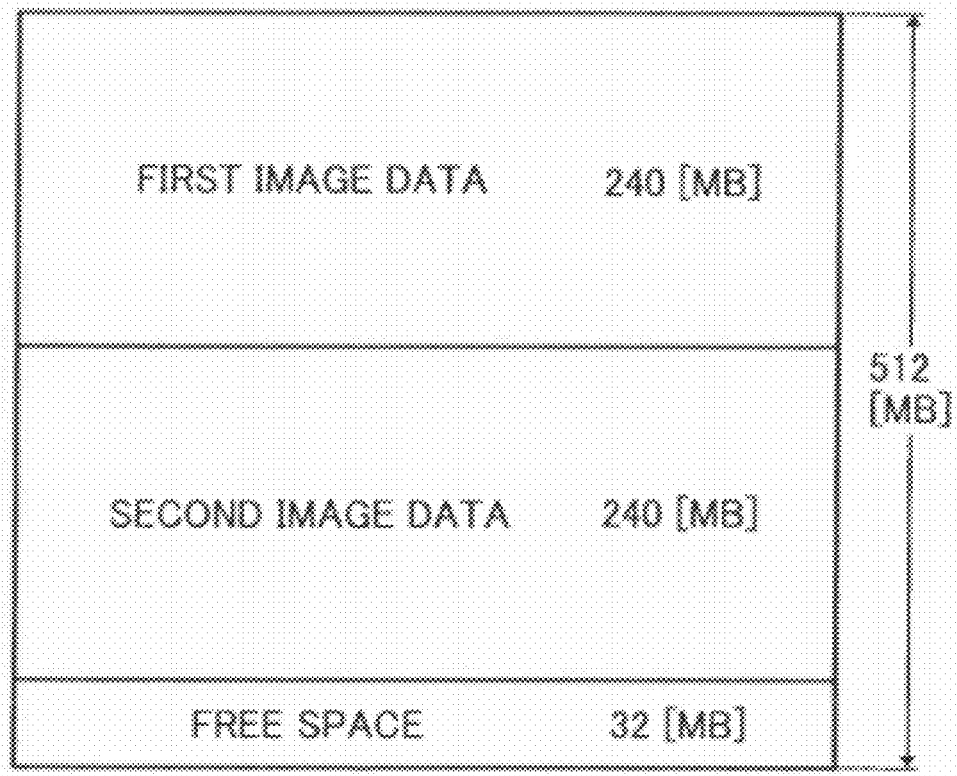

APPARATUS, METHOD, AND COMPUTER PROGRAM PRODUCT FOR PROCESSING IMAGE

CROSS-REFERENCE TO RELATED APPLICATIONS

The present application claims priority to and incorporates by reference the entire contents of Japanese priority document 2007-293164 filed in Japan on Nov. 12, 2007 and Japanese priority document 2008-270137 filed in Japan on Oct. 20, 2008.

BACKGROUND OF THE INVENTION

1. Field of the Invention

The present invention relates to a technology for detecting a dust near a scanning position of an original when reading an image of the original to generate image data.

2. Description of the Related Art

Some of image reading devices used in image processing apparatuses such as multifunctional products (MFPs) can scan both surfaces of an original at the same time (see, for example, Japanese Patent Application Laid-open No. 2007-82033). FIG. 25 is a schematic diagram of a conventional image reading device disclosed in Japanese Patent Application Laid-open No. 2007-82033. The conventional image reading device includes an automatic document feeder (ADF) 101 on the upper side and an optical reading unit 102 on the lower side.

The ADF 101 includes a feeder tray 151 on which originals are stacked, a contact image sensor (CIS) 135 that scans an image from the original and converts the image to an electrical signal, a discharge tray 152 onto which the original is discharged after the scanning, and a conveyer mechanism that conveys the original from the feeder tray 151 to the discharge tray 152 passing on the CIS 135. The conveyer mechanism includes a pick-up roller 153, a conveyer drum 154, and a discharge roller 157. The CIS 135 includes, although not shown, a light source such as a light-emitting diode (LED), a SELFOC lens array, an image sensor element, an analog-to-digital (A/D) converter circuit, and a digital processing circuit. A white reference roller 137 is arranged in opposite to the CIS 135.

The optical reading unit 102 includes a first carriage 174 including a xenon lamp 160 and a mirror, a second carriage 176 including two mirrors, a lens 178, a charge coupled device (CCD) sensor 161, a sensor board unit (SBU), and a driving unit (not shown) that drives the first carriage 174 and the second carriage 176. The SBU includes a signal processing unit that processes a signal from the CCD sensor 161. An exposure glass 180 and a scanning aperture 181 are provided on the upper surface of the optical reading unit 102. A white reference plate 182 is positioned over the end of the exposure glass 180 that is close to the scanning aperture 181.

The image reading device has a duplex scanning mode in which both surfaces of the original are scanned with the ADF 101 conveying the original. In the duplex scanning mode, the original is conveyed from the feeder tray 151 by the conveyer mechanism with the first carriage 174 being fixed below the scanning aperture 181. The front surface of the original is scanned when the original passes over the scanning aperture 181, and the rear surface of the original is scanned when the original passes on the CIS 135. Thus, the image reading device scans the both surfaces of the original with a single convey operation.

FIG. 26 is a block diagram of a conventional image processing apparatus including an image reading device such as the one shown in FIG. 25, although it is not described in a literature. The conventional image processing apparatus writes image data obtained from the front surface and the rear surface of the original to a memory. After that, the conventional image processing apparatus reads the image data of the front surface from the memory, processed the image data, and sends it to a controller, and then reads the image data of the rear surface from the memory, processed the image data, and sends it to the controller.

A reading unit 1, which optically reads the front surface of the original, focuses a reflection light generated by reflection of a lamp light on the original on a CCD as a light-receiving element. The light-receiving element is incorporated in a front surface sensor board unit (SBU_U) 2. The light-receiving element converts the image signal into an electric signal. The front surface sensor board unit 2 converts the electric signal into a digital signal, and sends it to a buffer memory controller (BMCTL) 51.

Similarly, a reading unit 3, which optically reads the rear surface of the original, obtains the image data by scanning the rear surface with a CIS, and thus the image data is converted to an electric signal. A rear surface sensor board unit (SBU_D) 4 converts the electric signal into a digital signal, and sends it to the buffer memory controller 51.

Upon receiving the front image data from the front surface sensor board unit 2 and the rear image data from the rear surface sensor board unit 4, the buffer memory controller 51 temporarily stores the image data in a buffer memory (BMEM) 6. After that, the front image data is sent from the buffer memory 6 to an image processing processor (IPP) 7. The image processing processor 7 makes up for degradation of signals caused at the scanning, and sends it to an image-data control unit (CDIC) 8.

The image-data control unit 8 controls transmission of image data between functional devices and data buses. More particularly, the image-data control unit 8 controls transmission of image data between the front surface sensor board unit 2, the rear surface sensor board unit 4, a parallel bus 11, and the image processing processor 7, and transmission of image data between a system controller 13 and a process controller 22. The system controller 13 is, for example, a central processing unit (CPU), which controls the image processing apparatus.

Upon receiving the front image data from the image processing processor 7, the image-data control unit 8 sends the front image data to an image-memory-access control unit (IMAC) 12 via the parallel bus 11. Under control of the system controller 13, the image-memory-access control unit 12 controls access to a memory (MEM) 15 with the image data, load of print data for an external personal computer (PC) that is connected to a network 16, and compression/decompression of the image data for efficient memory usage.

The image-memory-access control unit 12 compresses the image data, and writes the compressed image data to the memory 15. The image data is read from the memory 15 as appropriately. After the front image data is written in the memory 15, the buffer memory controller 51 reads the rear image data from the buffer memory 6. The rear image data is written in the memory 15 after processed in the same manner as the front image data is processed. The image-memory-access control unit 12 reads the image data from the memory 15, decompresses the image data, and sends the decompressed image data to the image-data control unit 8 via the parallel bus 11.

After that, the image-data control unit 8 sends the image data to the image processing processor 7. The image processing processor 7 performs an image quality processing, and sends the processed image data to a video-data control unit (VDC) 9. The video-data control unit 9 performs pulse control based on the received image data, and thereby an image forming unit 10 forms an image on a recording medium as a reproduced image.

In the flow of image data, the functions as the MFP are implemented under control of the parallel bus 11 and the image-data control unit 8. When a plurality of jobs, for example, copying, scanning, and printing are executed in parallel, the system controller 13 and the process controller 22 control assignment of a right to use the reading units 1 and 3, the image forming unit 10, and the parallel bus 11 to the jobs. The process controller 22 controls the flow of image data. The image-memory-access control unit 12 controls the image processing apparatus, and controls activation of the resources. The user selects a desired function of the MFP and adjusts detailed settings for copying or scanning by manipulating an operation panel 17. The system controller 13 and the process controller 22 communicate with each other via the parallel bus 11, the image-data control unit 8, and a serial bus 21. The image-data control unit 8 performs data format conversion between parallel data and serial data so that the image data can be transferred between the parallel bus 11 and the serial bus 21.

When the front surface and the rear surface are scanned, the image processing processor 7 receives the front image data from the front surface sensor board unit 2 and the rear image data from the rear surface sensor board unit 4, and performs the image quality processing. Upon receiving the processed image data from the image-data control unit 8 via the parallel bus 11, the image-memory-access control unit 12 stores the processed image data in the memory 15 or a hard disk drive (HDD) 14. The image-memory-access control unit 12 reads the front image data and the rear image data from the memory 15 or the HDD 14, and sends them to the PC via the network 16 as appropriately.

FIG. 27 is a block diagram of the buffer memory controller 51. In the buffer memory controller 51, when the front image data is received from the front surface sensor board unit 2, the front image data is written in the buffer memory 6 via a first-image-input control unit 511, a first-memory-write control unit 512, a memory-access arbitration unit 513, and a memory interface (I/F) control unit 514. On the other hand, when the rear image data is received from the rear surface sensor board unit 4, the rear image data is written in the buffer memory 6 via a second-image-input control unit 515, a second-memory-write control unit 516, the memory-access arbitration unit 513, and the memory I/F control unit 514.

The front image data and the rear image data are sent from the buffer memory 6 to the image processing processor 7 via the memory I/F control unit 514, the memory-access arbitration unit 513, and a memory-read control unit 517.

FIG. 28 is a block diagram of the image processing processor 7. Upon receiving the image data from the buffer memory controller 51, an input I/F 71 sends the image data to a scanned-image processing unit 72. The scanned-image processing unit 72 makes up for degradation of the image quality of the image data that has been just scanned (hereinafter, "scanned data"), by using various corrections including shading correction, gamma correction, modulation transfer function (MTF) correction, dust detection, and dust correction. The scanned-image processing unit 72 sends the corrected image data to the image-data control unit 8 via an output I/F 73.

Before the image is formed on the recording medium, an image-quality processing unit 75 receives the image data from the image-data control unit 8 via an input I/F 74, and adjusts gradation of the image data by using approximate approaches. More particularly, the image-quality processing unit 75 performs density adjustment, dithering, and random dithering. The processed image data is sent to the video-data control unit 9 via an output I/F 76. If the corrected image data that has been processed by the scanned-image processing unit 72 is stored in the memory 15, various image data with different qualities are created from the single corrected image data, and the user can check the various image data with different qualities. For example, various images that give different impressions can be formed by changing density or the number of lines of dithering matrix. The image-quality processing unit 75 can create various image data from the corrected image data stored in the memory 15 instead of from the scanned data. If the reading unit is a stand-alone scanner, the image processing processor 7 corrects quality defects and adjusts the gradation at the same time, and sends the processed image data to the image-data control unit 8. A command control unit 77 switches the processes, changes order of the processes, or the like.

FIG. 29 is a block diagram of the image-data control unit 8. An image-data input control unit 81 receives the image data processed by the image processing processor 7. A data compressing unit 82 compresses the received image data, thereby creating compressed data that can be transferred in a shorter time via the parallel bus 11. The compressed data is sent to the parallel bus 11 via a parallel data I/F 84. On the other hand, upon receiving compressed image data from the parallel bus 11 via the parallel data I/F 84, a data decompressing unit 85 decompresses the compressed image data. The decompressed image data is sent to the image processing processor 7 via an image-data output control unit 86.

The image-data control unit 8 enables communication between the system controller 13 and the process controller 22. Upon receiving parallel data from the system controller 13 via the parallel bus 11, the image-data control unit 8 converts the parallel data to serial data, and sends the serial data to the process controller 22. Upon receiving serial data from the process controller 22 via the serial bus 21, the image-data control unit 8 converts the serial data to parallel data, and sends the parallel data to the system controller 13.

FIG. 30 is a block diagram of the video-data control unit 9. Upon receiving the image data from the image processing processor 7, the video-data control unit 9 processes the image data based on properties of the image forming unit 10 (dot re-arrangement process by an edge smoothing unit 91, pulse control by a pulse control unit 92 for creating dots of the image data, and etc.) and sends the processed image data to the image forming unit 10. The video-data control unit 9 can perform, in addition to image-data processing, format conversion by using a data converting unit 94. Upon receiving parallel data from a parallel data I/F 93, the data converting unit 94 converts the parallel data to serial data. On the other hand, upon receiving serial data from a serial data I/F 95, the data converting unit 94 converts the serial data to parallel data. With this configuration, the video-data control unit 9 solely enables communication between the system controller 13 and the process controller 22.

FIG. 31 is a block diagram of the image-memory-access control unit 12. The image-memory-access control unit 12 writes/reads the image data to/from the memory 15. Moreover, the image-memory-access control unit 12 receives code data from, for example, an external PC, and loads the code data as the image data.

A parallel data I/F 121 is connected to the parallel bus 11 and controls transmission/reception of the image data. Upon receiving the code data from the external PC via the network 16, the image-memory-access control unit 12 stores the code data in a local area of a line buffer 123. Upon receiving a load command from the system controller 13 via a system controller I/F 124, a video control unit 125 loads the code data stored in the line buffer 123 as the image data.

The loaded image data or the image data received from the parallel bus 11 via the parallel data I/F 121 is stored in the memory 15. More particularly, a data converting unit 122 selects the image data to be stored, and a data compressing unit 126 secondarily compresses the selected image data for efficient usage of the memory 15. A memory-access control unit 127 stores the compressed image data in the memory 15, managing an address in the memory 15.

The memory-access control unit 127 reads target image data from the memory 15 by an address of the target image data. The image data is then decompressed by a data decompressing unit 128. If the decompressed image data is to be sent to the parallel bus 11, the data converting unit 122 converts the image data to the parallel data, and sends the parallel data via the parallel data I/F 121.

FIG. 32 depicts image paths IP1, IP2, and IP3 along which the scanned image data of both surfaces are transferred. Along the image path IP1, the front image data is sent to the buffer memory controller 51 via the reading unit 1 and the front surface sensor board unit 2, and is stored in the buffer memory 6. Along the image path IP2, the rear image data is sent to the buffer memory controller 51 via the reading unit 3 and the rear surface sensor board unit 4, and is stored in the buffer memory 6.

After that, along the image path IP3, the front image data and the rear image data are sent from the buffer memory 6 to the image-memory-access control unit 12 via the buffer memory controller 51, the image processing processor 7, the image-data control unit 8, and the parallel bus 11, and is stored in the memory 15. The front image data and the rear image data are then stored in the HDD 14 as appropriately.

FIG. 33 is a timing chart illustrating timing when the image data is transferred. In the timing chart, signals attached with U2B_ at their heads are indicative of signals that are sent from the front surface sensor board unit 2 to the buffer memory controller 51; signals attached with D2B_ at their heads are indicative of signals that are sent from the rear surface sensor board unit 4 to the buffer memory controller 51; and signals attached with B2I_ at their heads are indicative of signals that are from the buffer memory controller 51 to the image processing processor 7. Signals named FGATEB are frame gate signals; signals named LSYNCB are line synchronization signals. Signals named RD are signals of red image data; signals named GD are signals of green image data; and signals named BD are signals of blue image data. When the frame gate signal is low, a line synchronization signal and the image data signals (i.e., RD, GD, and BD) are active. Pieces of the image data, each corresponding to one line, are sent one by one in synchronization with the line synchronization signal. The image data is 8-bit pixels.

As shown in FIG. 25, the CIS 135 as the image sensor for scanning the rear surface is arranged downstream of the scanning aperture 181 through which the front surface is scanned. This is because the buffer memory controller 51 receives the rear image data a little after receiving of the front image data as shown in FIG. 33. The rear image data is sent from the buffer memory controller 51 to the image processing processor 7 in serial, following the front image data.

FIG. 34 is an enlarged view of the CIS 135 and the white reference roller 137 shown in FIG. 25. The original is conveyed between the CIS 135 and the white reference roller 137. FIG. 35 is a schematic diagram of the original and the scanned data that is obtained by using the CIS 135 shown in FIG. 34. An image A is the original, and an image B is the scanned data. The CIS 135 scans the original, one line after another. Those lines are arranged in the sub-scanning direction Y, i.e., a direction in which the original shown in FIG. 34 is fed. Pixels of each line are arranged in the main-scanning direction X. The reading unit 3 scans the white reference roller 137 before scanning the original, thereby obtaining the white reference data that is used for correcting the scanned image data. In other words, the white reference roller 137 is used for generating the white reference data, while conveying the original. A line length L of the white reference data is equal to a circumference length of the white reference roller 137 (i.e., diameter φ×circle ratio π).

FIG. 36 depicts the CIS 135 with a dust on its scanning surface; FIG. 37 is a schematic diagram of the scanned data that is obtained from the white reference roller 137 and the scanned data that is obtained from the original by using the CIS 135 shown in FIG. 36. The image A is the original, the image B is the scanned data, and an image C is the corrected image data. As show in the image B, undesired lines are formed on both the white reference data and the image data because the dust is on the CIS 135. To obtain image data with no undesired line, the dust detection is performed before scanning of the original. If a dust is detected, a message for causing the user to remove the dust is displayed on the operation panel 17.

It is possible to remove the undesired lines from the white reference data and the image data by identifying a position of the dust and replacing correction data with an area including the undesired line by using the dust correction. A method of the dust correction is not explained in detail because the dust correction is a widely-known technique. As shown in the image C, the image data is corrected to approximately dustless data.

FIG. 38 depicts the white reference roller 137 with a dust on its circumference; FIG. 39 is a schematic diagram of the scanned data that is obtained from the original and the scanned data that is obtained from the white reference roller 137 shown in FIG. 38. The image A is the original, and the image B is the scanned data. Because the dust is on the circumference of the white reference roller 137 as shown in FIG. 38, an interrupted line is formed on the white reference data as shown the image B of FIG. 39. The interrupted line has a predetermine cycle corresponding to the circumference length of the CIS 135. No undesired line is formed on the image data because no dust is on the CIS 135. However, there is possibility of miss-correction because the white reference data with the undesired line is used.

A position of the dust, on the CIS 135 or on the white reference roller 137, can be identified by analyzing the white reference data. If the continuous line shown in the image B of FIG. 37 is formed on the white reference data, the dust is on the CIS 135. On the other hand, if the interrupted line shown in the image B of FIG. 39 is formed on the white reference data, the dust is on the white reference roller 137.

FIG. 40 is a schematic diagram for explaining signals that are sent from the rear surface sensor board unit 4 to the image processing processor 7 via the buffer memory controller 51. FIG. 41 is a timing chart of the signals shown in FIG. 40, illustrating timing when the white reference data and the image data as shown in, for example, the image B of FIG. 39 are sent. There are a dust detection period, a pause period, and an image-data input period.

FIG. 42 is a flowchart of a single-surface storing process in which the buffer memory controller 51 stores the white reference data and the image data in the buffer memory 6.

The buffer memory controller 51 determines whether a dust detection mode is ON (Step S51). If the dust detection mode is ON (Yes at Step S51), the buffer memory controller 51 stores the dust detection data (i.e., white reference data) in the buffer memory 6 in synchronized with the line synchronization signal (i.e., D2B_LSYNCB signal) (Step S53) during a period between when a D2B_FGATEB signal is asserted (Yes at Step S52) and when the D2B_FGATEB signal is negated (Yes at Step S54). The user sets ON/OFF of the dust detection mode by manipulating the operation panel 17. Settings of the dust detection mode are stored in a register (not shown) incorporated in the buffer memory controller 51. After the buffer memory controller 51 finishes storing of the dust detection data (Step S55), the buffer memory controller 51 stores the image data in the buffer memory 6 in synchronized with the D2B_LSYNCB signal (Step S57) during a period between when the D2B_FGATEB signal is asserted (Yes at Step S56) and when the D2B_FGATEB signal is negated (Yes at Step S58). If the dust detection mode is OFF (No at Step S51), the buffer memory controller 51 stores only the image data in the buffer memory 6. In this manner, the buffer memory controller 51 separately stores the white reference data at Step S53 (see (7) of FIG. 42) and the image data at Step S57 (see (8)), which makes the system control complicated.

FIG. 43 is a flowchart of a single-surface reading process of reading the white reference data and the image data from the buffer memory 6. The white reference data for the front image data is obtained by scanning the white reference plate 182, and the white reference data for the rear image data is obtained by scanning the white reference roller 137.

The buffer memory controller 51 activates reading operation from the buffer memory 6 (Step S60) and determines whether the dust detection mode is ON (Step S61). If the dust detection mode is ON (Yes at Step S61), the buffer memory controller 51 asserts the D2B_FGATEB signal (Step S62) and sends lines of the dust detection data (equivalent to the sub-scanning length of the white reference plate 182 or the white reference roller 137) to the image processing processor 7 in synchronized with the D2B_LSYNCB signal (Step S63). When the buffer memory controller 51 finishes sending all lines of the dust detection data, (Yes at Step S64), the buffer memory controller 51 negates the D2B_FGATEB signal (Step S65).

After that, the buffer memory controller 51 is on standby for a predetermined period (Step S66). When the predetermined period has passed, the buffer memory controller 51 asserts a B2I_FGATEB signal for sending the image data (Step S67), and sends received lines of the image data to the image processing processor 7 in synchronized with the line synchronization signal (i.e., B2I_LSYNCB signal) (Step S68). When the buffer memory controller 51 finishes sending of all lines of the image data (Yes at Step S69), the buffer memory controller 51 negates the B2I_FGATEB signal (Step S70).

In this manner, the buffer memory controller 51 separately sends the white reference data at Steps S63 and S64 (see (9) of FIG. 43) and the image data at Steps S68 and S69 (see (10)), which makes the system control complicated.

FIG. 44 is a flowchart of a both-surface reading process of reading the white reference data and the image data from the buffer memory 6.

The buffer memory controller 51 activates reading operation from the buffer memory 6 (Step S71) and determines whether the dust detection mode for the front surface is ON (Step S72). If the dust detection mode for the front surface is ON (Yes at Step S72), the buffer memory controller 51 reads the white reference data for the front surface and the front image data in the same manner as in Steps S62 to S70 (Steps S73 to S81). After that, the buffer memory controller 51 determines whether the dust detection mode for the rear surface is ON (Step S82). If the dust detection mode for the rear surface is ON (Yes at Step S82), the buffer memory controller 51 reads the white reference data for the rear surface and the rear image data in the same manner as in Steps S73 to S81 (Steps S83 to S91).

In this manner, the buffer memory controller 51 separately sends the white reference data for the front surface at Steps S74 and S75 (see (11) of FIG. 44), the front image data at Steps S79 and S80 (see (12)), the white reference data for the rear surface at Steps S84 and S85 (see (13)), and the rear image data at Steps S89 and S90 (see (14)), which makes the system control more complicated.

FIG. 45A is a timing chart when the dust detection is performed before scanning of each page of the original. In the example shown in FIG. 45A, even if a dust gets attached during scanning of a certain page, the dust is detected before scanning the next page. However, the scanning speed is low. FIG. 45B is a timing chart when the dust detection is performed only before scanning of the top page of the original. In the example shown in FIG. 45B, the scanning speed is higher than the example shown in FIG. 45B. However, if a dust gets attached during scanning of a certain page, an undesired line may be formed on image data corresponding to the next page and subsequent pages.

FIG. 46 is a schematic diagram for explaining the required capacity of the buffer memory 6 for storing therein the dust detection data (white reference data) and the image data. If the original is an A3 size (297 mm×420 mm main-scanning direction×sub-scanning direction) or a double letter size (279.4 mm×431.8 mm main-scanning direction×sub-scanning direction), the scanning area is set to 320 mm×431.8 mm, taking it into consideration that a margin for the correction data is added in the main-scanning direction and an actual size being of the recording medium is larger than the A3 size. If the diameter $\phi$ of the white reference roller 137 is 30 mm, then the circumference length is 94.2 mm. It is assumed that a full-color image is scanned as the original and both surfaces of the original are stored with a scanning resolution of 600 dots per inch (dpi) with 8-bit pixels. The main-scanning length of 320 mm is equal to 7205 pixels. The upper address should be in a single line because data is stored in the buffer memory 6 as a dynamic random access memory (DRAM) by using burst transfer. Assume that one line is 8 kilobytes (8 kilobytes per line, because of each pixel being 8 bit). In other words, the scanning conditions are as follows:

(1) Scanning area (main-scanning length × sub-scanning length)

| | |
|---|---|
| Original: | 320 mm × 431.8 mm |
| White reference roller 137: | 320 mm × 94.2 mm |

(2) Number of pixels × number of lines

| | |
|---|---|
| Original: | 8 kilobytes × 10200 |
| White reference roller 137: | 8 kilobytes × 2225 |

-continued (3) Required memory capacity

| | |
|---|---|
| Original: | 79.7 megabytes × 3 (RGB) = 239.1 megabytes ≈ 240 megabytes |
| White reference data: | 17.4 megabytes × 3 (RGB) = 52.2 megabytes ≈ 53 megabytes |

In this manner, the buffer memory 6 needs the capacity of 586 megabytes as shown in FIG. 46. The memory devices widely available in the DRAM market are 512-megabit memories, 768-megabit memories, and 1-gigabit memories. Therefore, twelve 512-megabit memories or six 1-gigabit memories are needed to obtain the capacity of 586 megabytes. Those memories cost roughly several tens of thousands yen.

FIG. 47 is a block diagram of another conventional image processing apparatus, although it is not described in a literature. The conventional image processing apparatus shown in FIG. 47 includes a dust detection unit (GOMI_U) 19 that is connected to both the front surface sensor board unit 2 and the buffer memory controller 51, and a dust detection unit (GOMI_D) 20 that is connected to both the rear surface sensor board unit 4 and the buffer memory controller 51. The dust detection is performed by the dust detection units 19 and 20, instead of the image processing processor 7, before data is stored in the buffer memory 6.

FIG. 48 is a block diagram of the dust detection units 19 and 20. The dust detection units 19 and 20 perform the dust detection and the dust correction. An input I/F 191 receives the front image data from the front surface sensor board unit 2, and sends the received front image data to a dust detection/correction unit 192. An input I/F 201 receives the rear image data from the rear surface sensor board unit 4, and sends the received rear image data to a dust detection/correction unit 202. The dust detection/correction units 192 and 202 perform the dust detection and the dust correction for the received image data. After that, the front image data and the rear image data are sent to the buffer memory controller 51 via output I/Fs 193 and 203, respectively.

FIG. 49 depicts signals that are sent from the front surface sensor board unit 2 to the dust detection unit 19, and signals that are sent from the dust detection unit 19 to the buffer memory controller 51. Signals that are sent from the rear surface sensor board unit 4 to the dust detection unit 20 and signals that are sent from the dust detection unit 20 to the buffer memory controller 51 are similar to those shown in FIG. 49.

FIG. 50 is a timing chart illustrating timing when the signals are sent from the front surface sensor board unit 2 to the dust detection unit 19. Those signals are active during the dust detection period and the image-data input period. FIG. 51 is a timing chart illustrating timing when the signals are sent from the dust detection unit 19 to the buffer memory controller 51. As shown in FIGS. 50 and 51, it is unnecessary to store the dust detection data in the buffer memory 6 because the dust detection unit 19 performs the dust detection. Thus, only the image data is stored in the buffer memory 6.

FIG. 52 is a schematic diagram for explaining the required capacity of the buffer memory 6 if the dust detection units 19 and 20 are in operation. Because the dust detection data is not stored in the buffer memory 6, the total required capacity is decreased to 480 megabytes. In other words, if the buffer memory 6 is 512-megabit memories, the number of memories decreases from 12 to eight. If the buffer memory 6 is 1-gigabit memories, the number of memories decreases from six to four. However, costs for the dust detection units 19 and 20 that can be an application specific integrated circuit (ASIC) or a field programmable gate array (FPGA) are added in the total costs.

Thus, the conventional image processing apparatus needs memories with high capacity, which makes the cost increase. Moreover, because it is necessary to transfer a large amount of dust detection data, it is difficult to shorten intervals between scanning of original. In contrast, in the conventional image processing apparatus, the required memory capacity decreases with an advantage of the dust detection units 19 and 20. However, adding of the dust detection units 19 and 20 results in the cost increase.

SUMMARY OF THE INVENTION

It is an object of the present invention to at least partially solve the problems in the conventional technology.

According to one aspect of the present invention, there is provided an apparatus for processing an image. The apparatus includes a white reference member from which white reference data is obtained; an image sensor that scans the white reference member line by line to obtain a plurality of lines of white reference data; a skipping unit that skips the white reference data with a predetermined skipping ratio to generate a skipped white reference data; and a dust detecting unit that detects a dust between the white reference member and the image sensor based on the skipped white reference data.

Furthermore, according to another aspect of the present invention, there is provided a method of processing an image. The method includes skipping a plurality of lines of white reference data obtained from an image sensor by scanning a white reference member line by line with a predetermined skipping ratio to generate a skipped white reference data; and detecting a dust between the white reference member and the image sensor based on the skipped white reference data.

Moreover, according to still another aspect of the present invention, there is provided a computer program product including a computer-usable medium having computer-readable program codes embodied in the medium. The program codes when executed cause a computer to execute skipping a plurality of lines of white reference data obtained from an image sensor by scanning a white reference member line by line with a predetermined skipping ratio to generate a skipped white reference data; and detecting a dust between the white reference member and the image sensor based on the skipped white reference data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a timing chart illustrating timing when the buffer memory controller receives the dust detection data and sends the received dust detection data to the buffer memory in a skipping mode 2 according to the first embodiment;

FIG. 6 is a flowchart of a storing process of storing the dust detection data and image data in the buffer memory according to the first embodiment;

FIG. 7A is a schematic diagram illustrating contents of the dust detection data stored in the buffer memory in the skipping mode 0;

FIG. 7B is a schematic diagram illustrating contents of the dust detection data stored in the buffer memory in the skipping mode 1;

FIG. 17 is a schematic diagram of a control circuit for controlling the skipping-control sequencer shown in FIG. 15;

FIG. 18 is a table containing counter value of a counter and mask signal corresponding to each line in various skipping modes;

FIG. 24 is a table containing skipping mode and skipping ratio corresponding to scanning resolution;

FIG. 27 is a block diagram of a buffer memory controller shown in FIG. 26;

FIG. 28 is a block diagram of an image processing processor shown in FIG. 26;

FIG. 44 is a flowchart of a both-surface reading process of reading the white reference data and the image data from the buffer memory in the conventional image processing apparatus;

FIGS. 45A and 45B are timing charts of dust detection timing in the conventional image processing apparatus;

FIG. 52 is a schematic diagram for explaining the required capacity of the buffer memory in the conventional image processing apparatus.

DETAILED DESCRIPTION OF THE PREFERRED EMBODIMENTS

Exemplary embodiments of the present invention are described in detail below with reference to the accompanying drawings.

Figure 1:
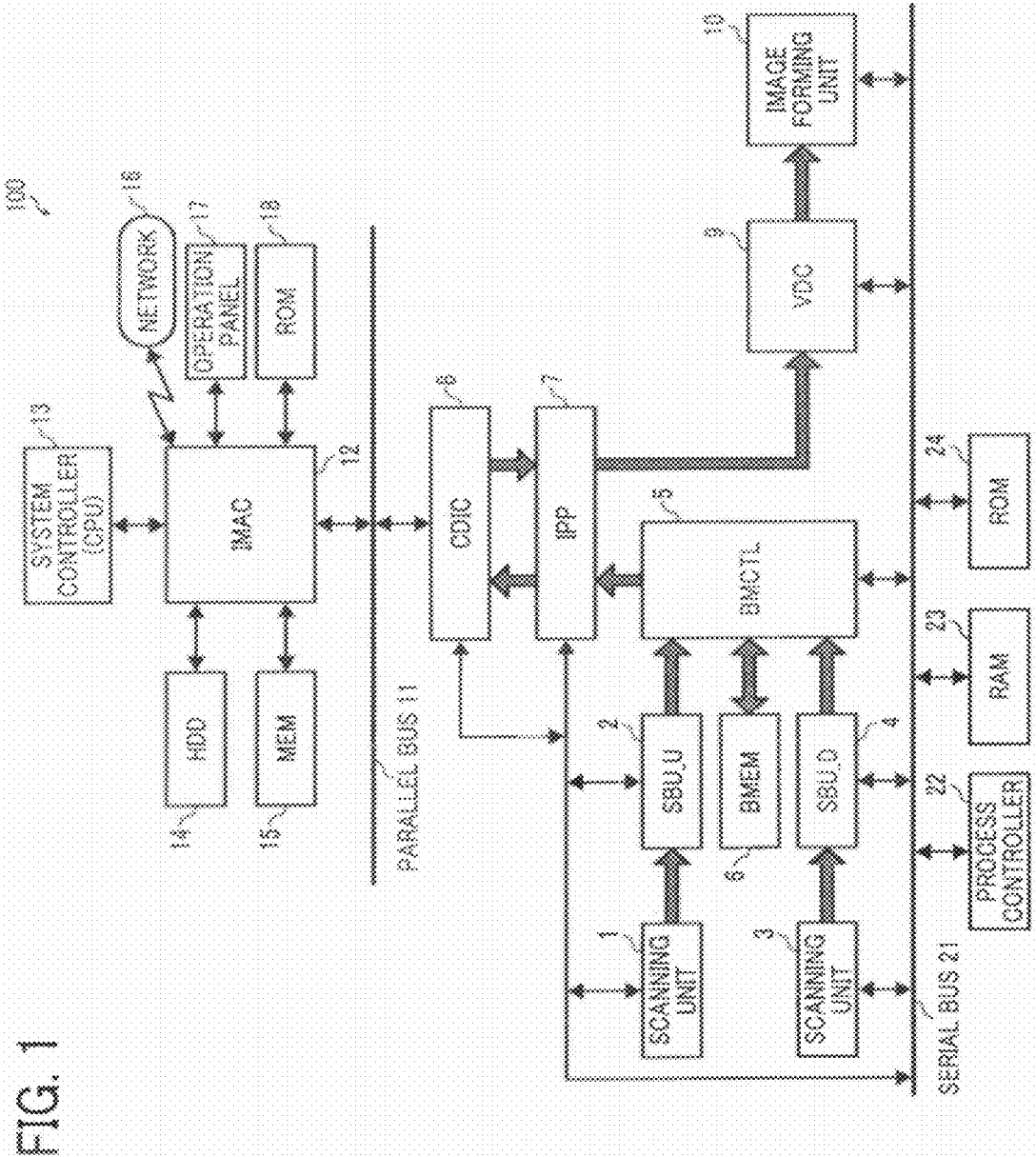
FIG. 1 is a block diagram of an image processing apparatus according to a first embodiment of the present invention.
Figure 25:
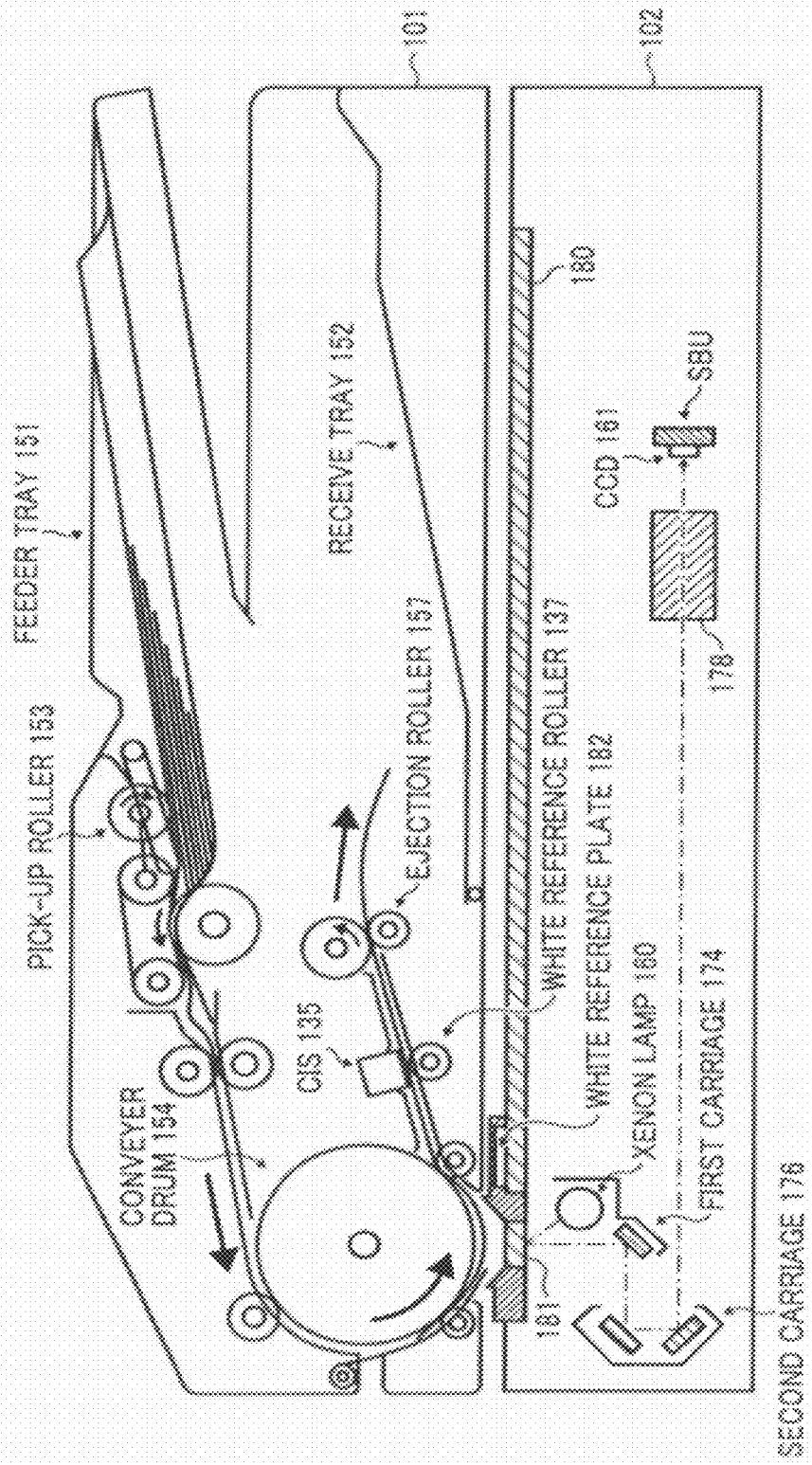
FIG. 25 is a schematic diagram of a conventional scanner capable of scanning both surfaces of an original at the same time.
Figure 26:
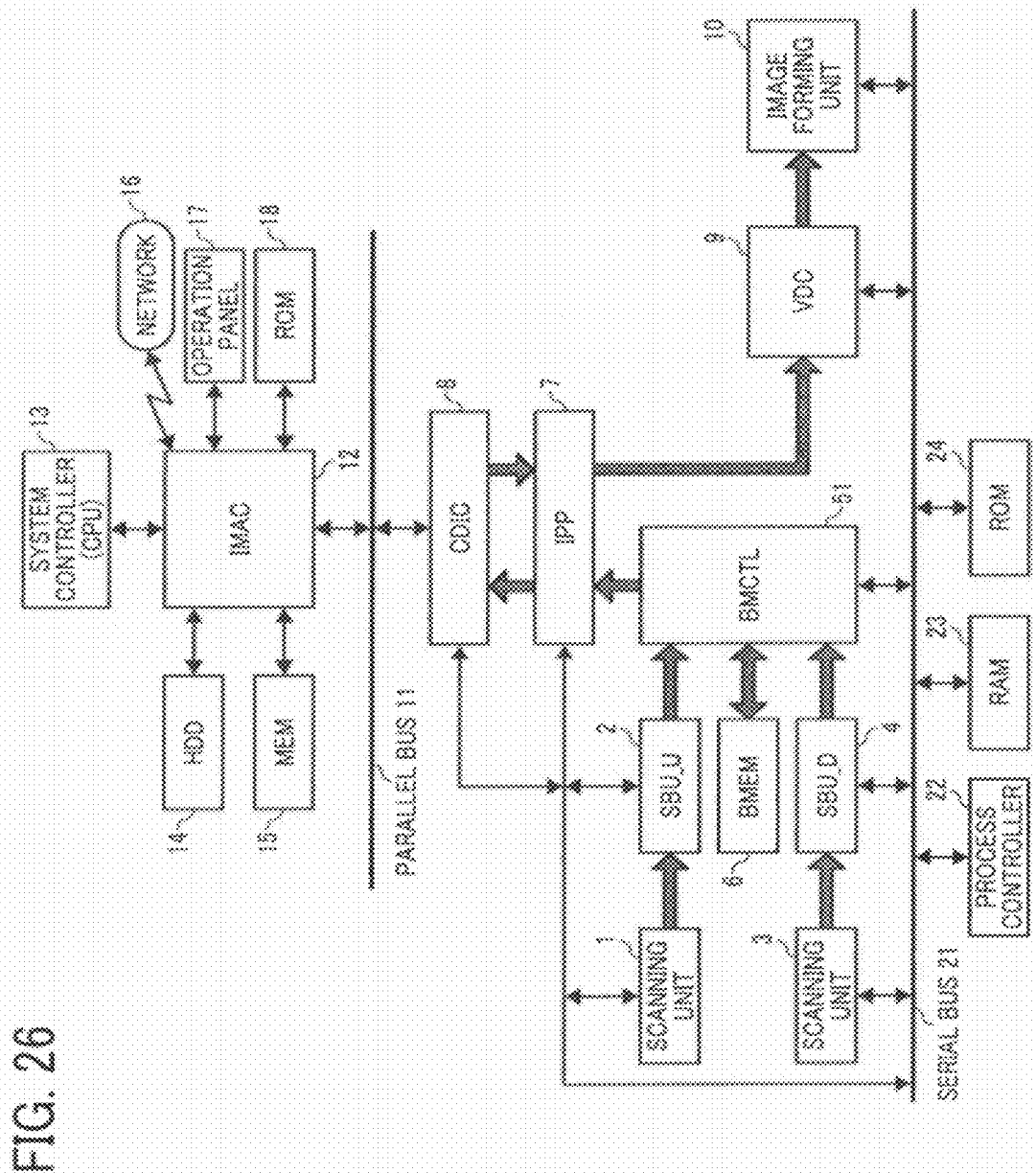
FIG. 26 is a block diagram of a conventional image processing apparatus including the conventional scanner shown in FIG. 25.
Figure 29:
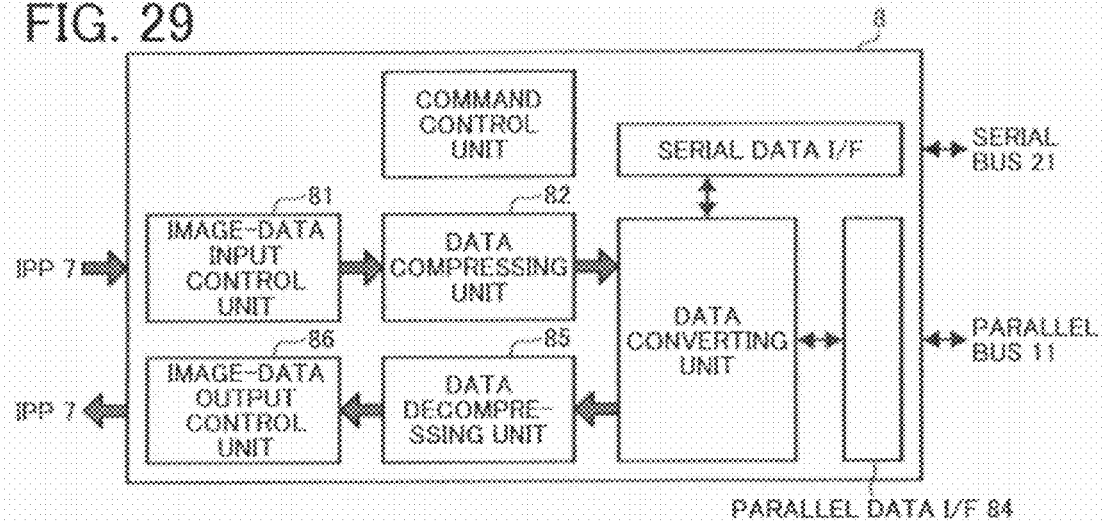
FIG. 29 is a block diagram of an image-data control unit shown in FIG. 26.
Figure 30:
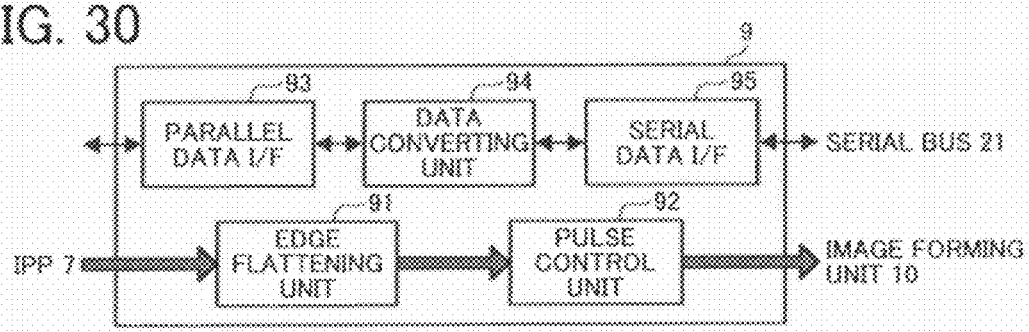
FIG. 30 is a block diagram of a video-data control unit shown in FIG. 26.
Figure 31:
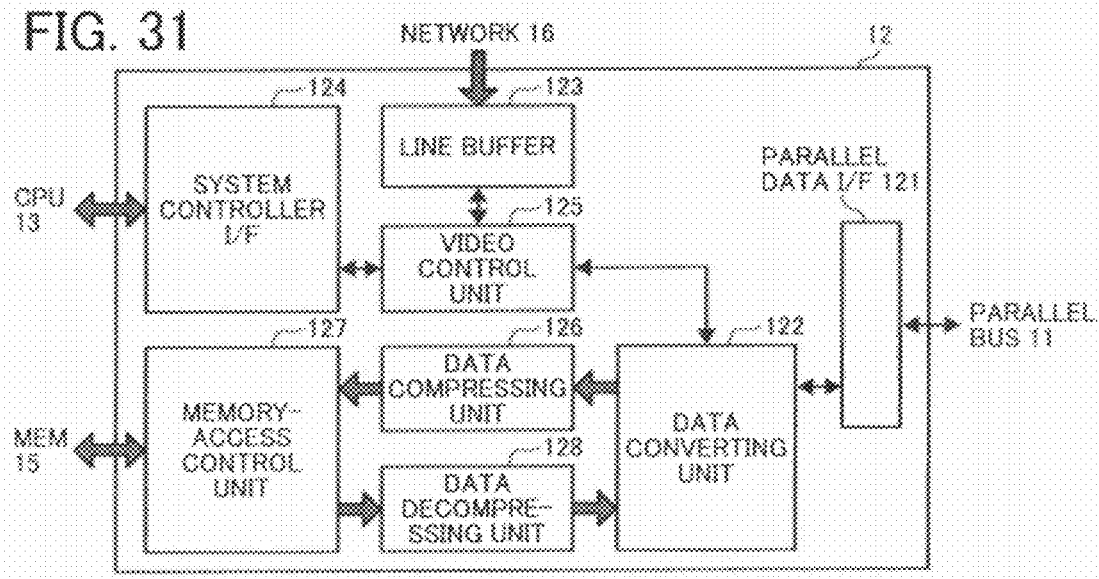
FIG. 31 is a block diagram of an image-memory-access control unit shown in FIG. 26.
Figure 32:
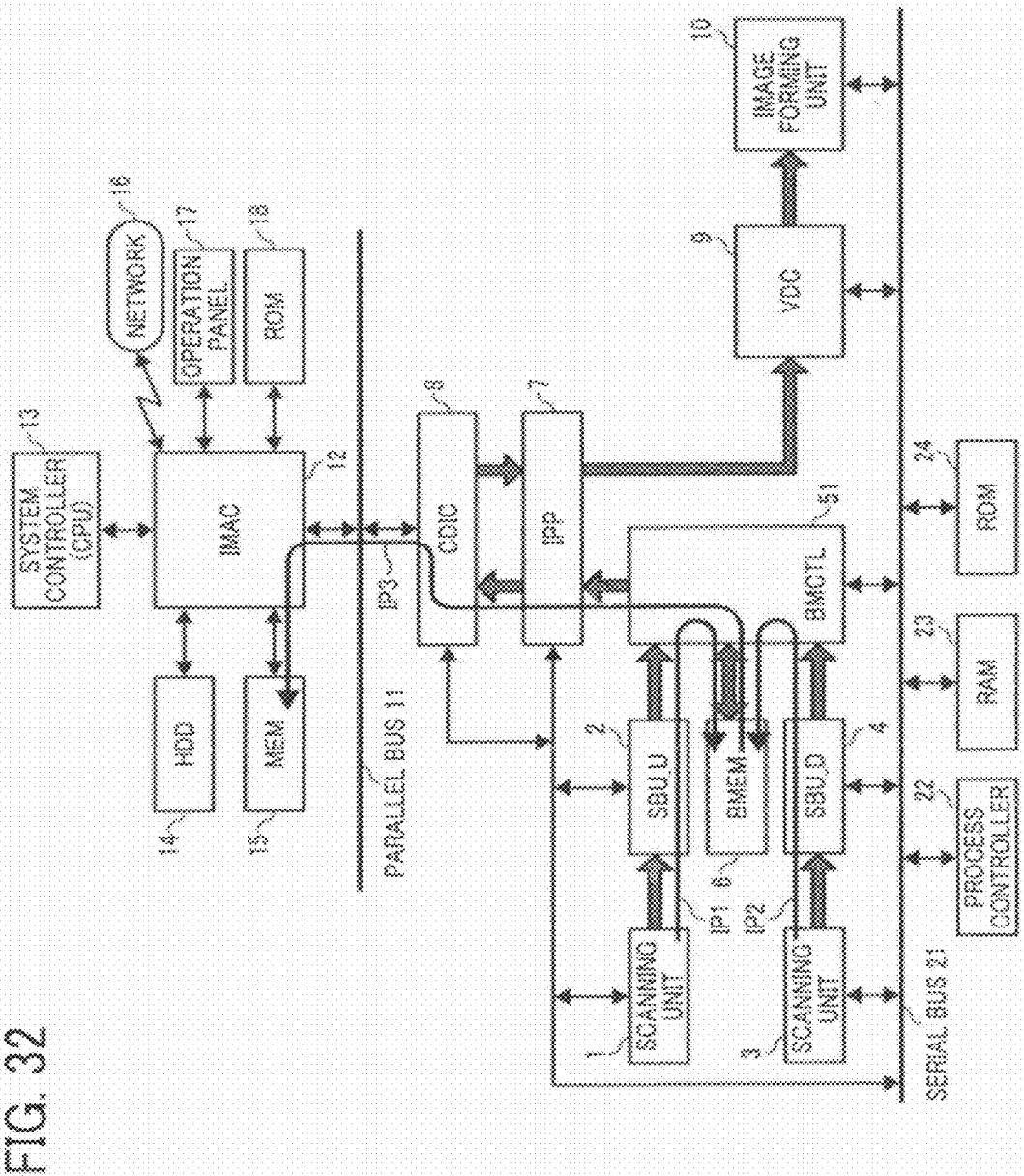
FIG. 32 depicts image paths along which scanned front image data and scanned rear image data are transferred.
Figure 33:
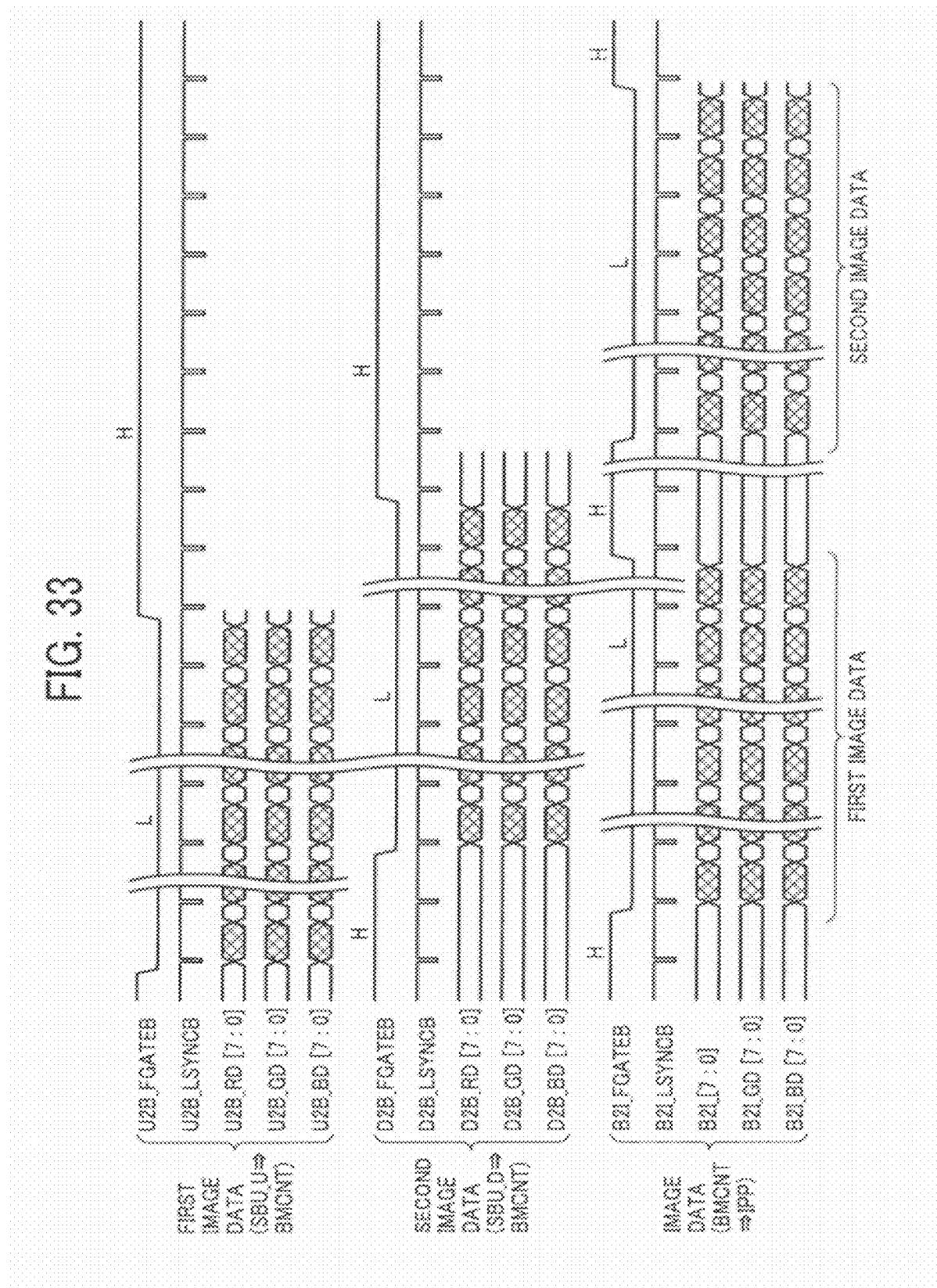
FIG. 33 is a timing chart illustrating timing when the image data is sent from a buffer memory to a memory in the conventional image processing apparatus.
Figure 34:
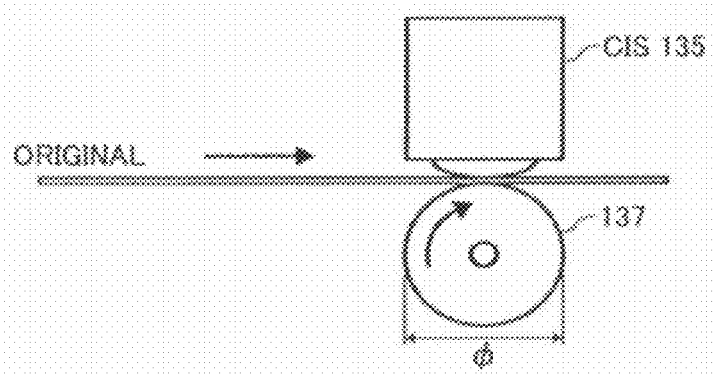
FIG. 34 is an enlarged view of a CIS and a white reference roller shown in FIG. 25.
Figure 35:
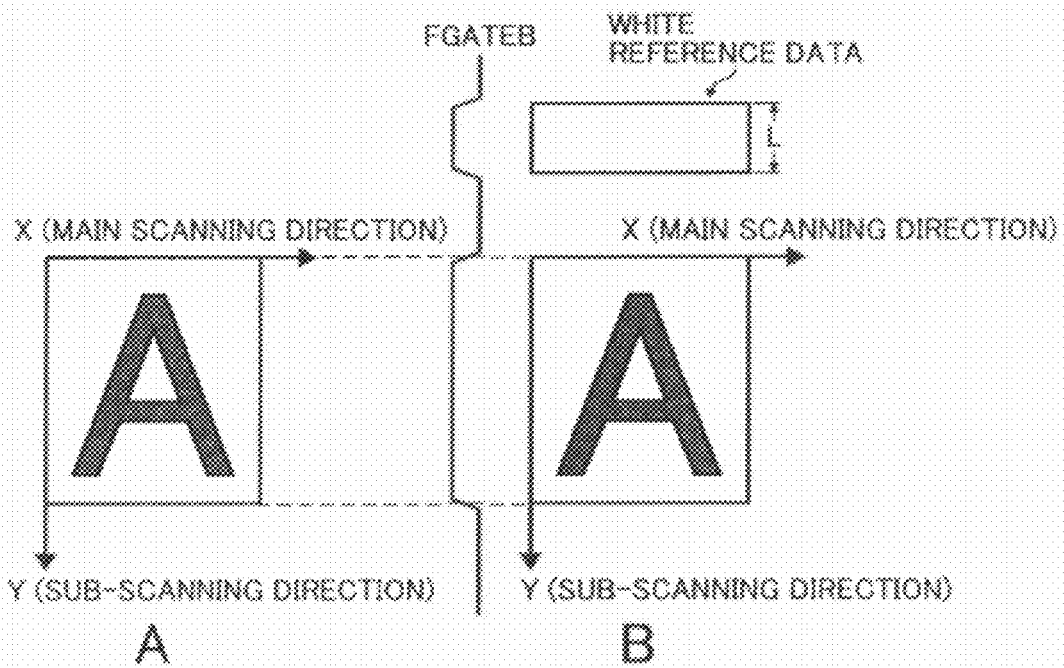
FIG. 35 is a schematic diagram of scanned data that is obtained from the original and scanned data that is obtained from the white reference roller by using the CIS shown in FIG. 34.
Figure 36:
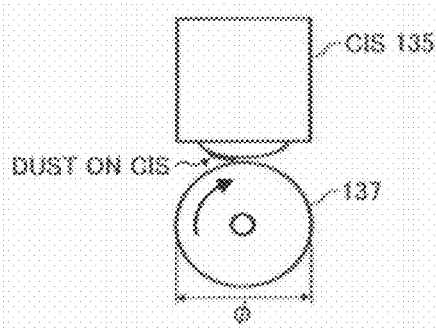
FIG. 36 is a schematic diagram of the CIS shown in FIG. 34 with a dust on its scanning surface.
Figure 37:
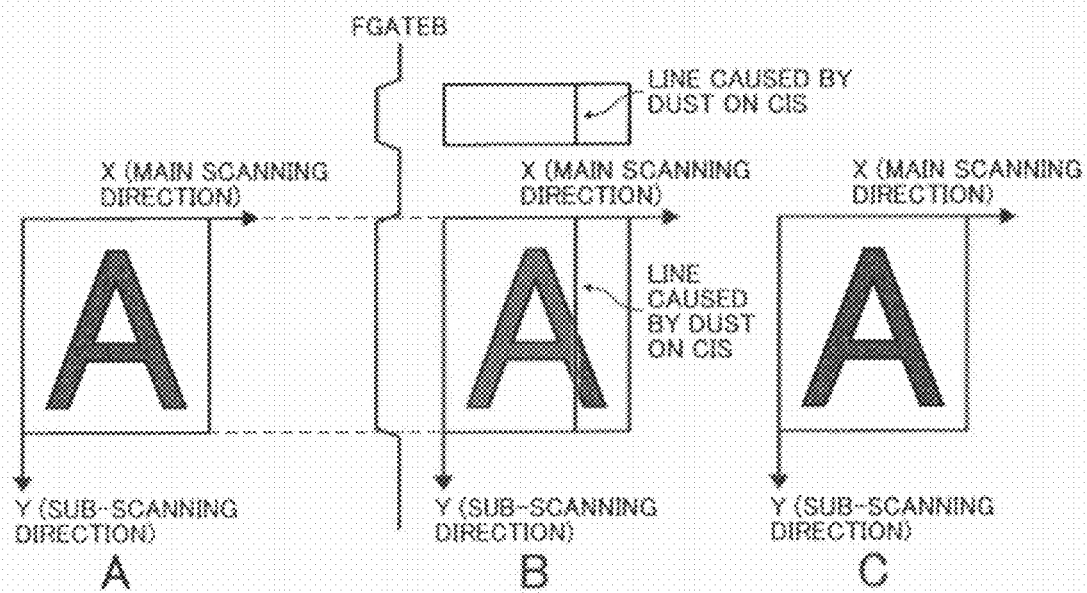
FIG. 37 is a schematic diagram of scanned data that is obtained from the original and scanned data that is obtained from the white reference roller both by using the CIS shown in FIG. 36, and corrected image data.
Figure 38:
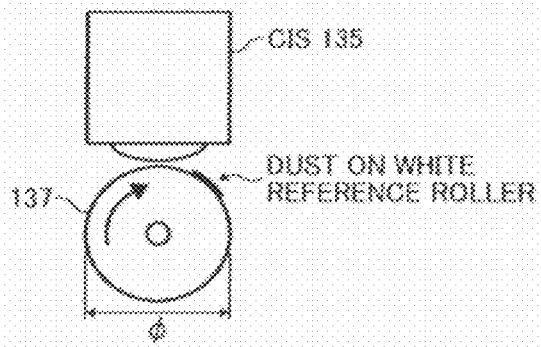
FIG. 38 is a schematic diagram of the white reference roller shown in FIG. 34 with a dust on its circumference.
Figure 39:
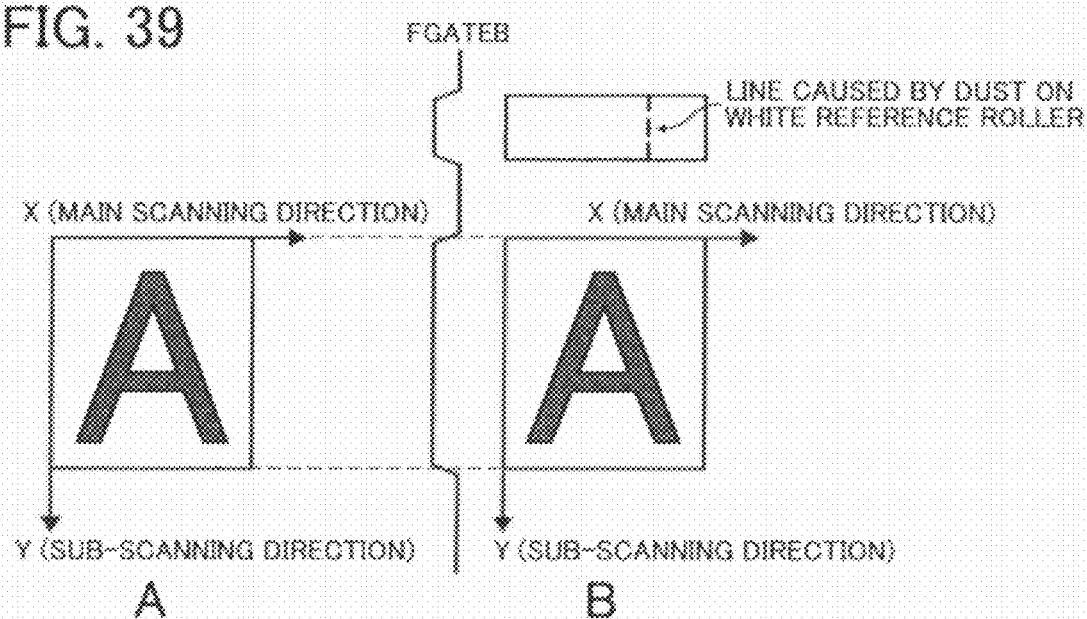
FIG. 39 is a schematic diagram of scanned data that is obtained from the original and scanned data that is obtained from the white reference roller shown in FIG. 38.
Figure 40:
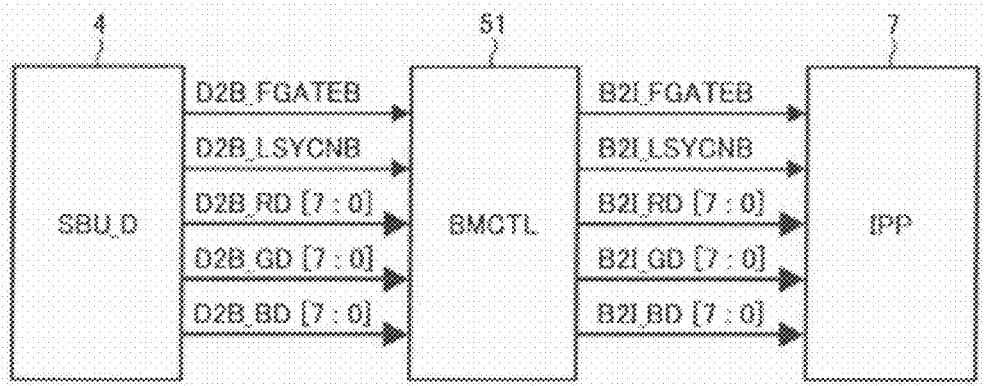
FIG. 40 is a schematic diagram for explaining signals that are sent from a rear surface sensor board unit to the image processing processor via the buffer memory controller in the conventional image processing apparatus.
Figure 41:
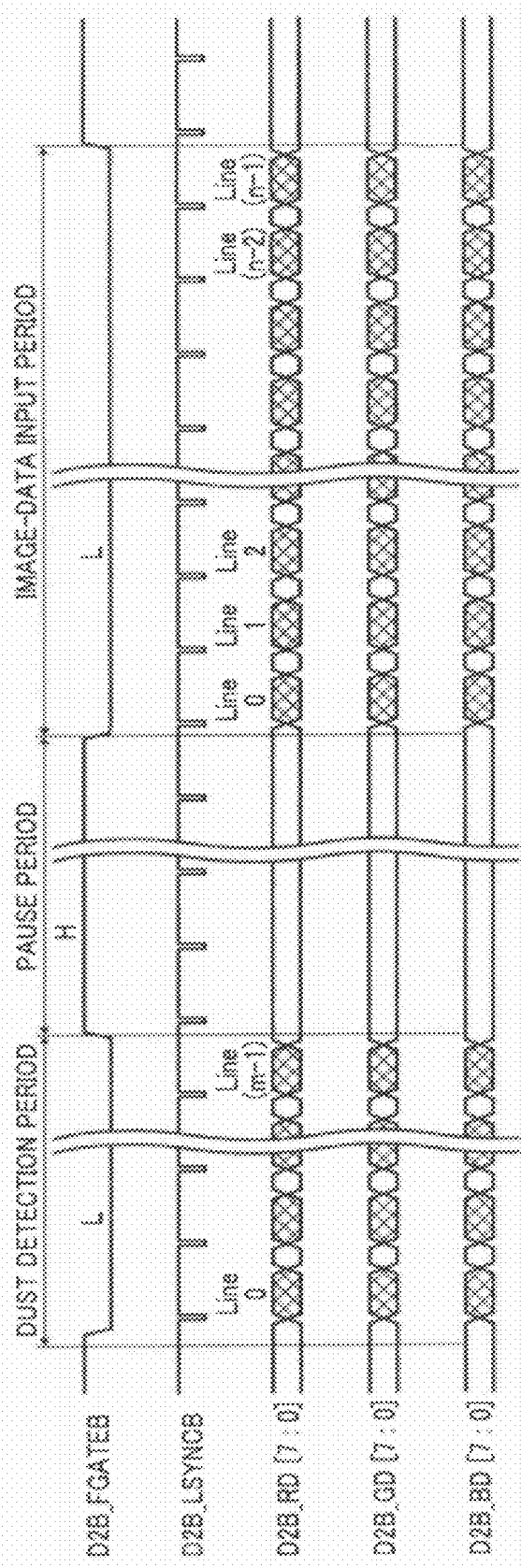
FIG. 41 is a timing chart of the signals shown in FIG. 40.

FIG. 1 is a block diagram of an image processing apparatus 100 according to a first embodiment of the present invention. Parts corresponding to those in the conventional image processing apparatus shown in FIG. 26 are denoted with the same reference numerals. The structure and function of a buffer memory controller (BMCTL) 5 incorporated in the image processing apparatus 100 is different from the structure and function of the buffer memory controller 51. The structure of the scanner in the first embodiment is same as the structure of the conventional scanner shown in FIG. 25.

Figure 2:
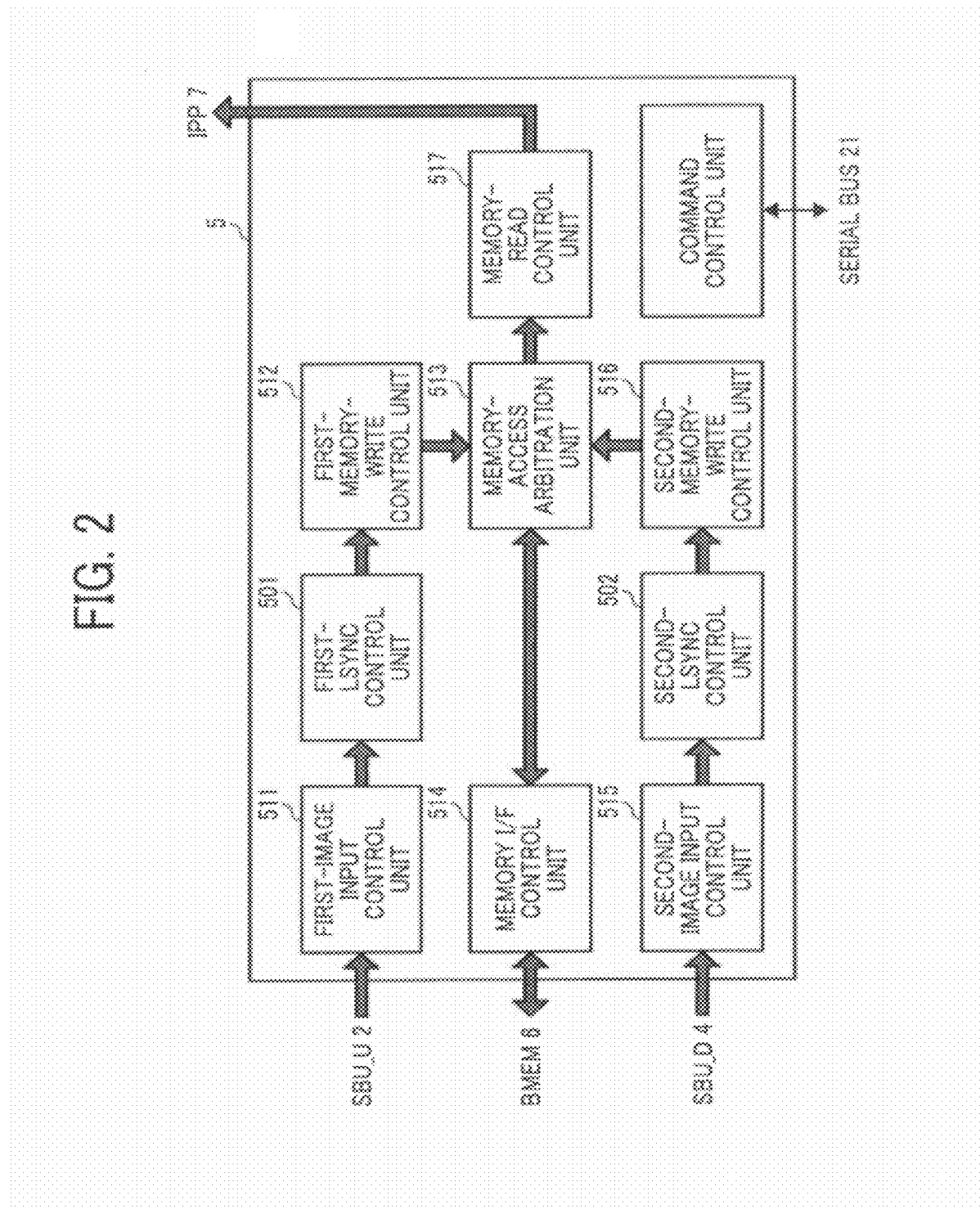
FIG. 2 is a block diagram of a buffer memory controller shown in FIG. 1.

FIG. 2 is a block diagram of the buffer memory controller 5. Parts corresponding to those in the buffer memory controller 51 shown in FIG. 27 are denoted with the same reference numerals. The buffer memory controller 5 is same as the buffer memory controller 51 except that the buffer memory controller 5 includes a first-LSYNC control unit 501 that is connected to both the first-image-input control unit 511 and the first-memory-write control unit 512, and a second-LSYNC control unit 502 that is connected to both the second-image-input control unit 515 and the second-memory-write control unit 516. The first-LSYNC control unit 501 and the second-LSYNC control unit 502 skips lines from the white reference data during the dust detection period, calculates an average of a plurality of lines of the white reference data, and masks the line synchronization signal during a period between the end of input of the white reference data and the start of input of the image data. Each of the first-LSYNC control unit 501 and the second-LSYNC control unit 502 includes a skipping-control sequencer and a control circuit. The first-LSYNC control unit 501 and the second-LSYNC control unit 502 will be described in detail later.

The user can select a skipping mode between ON and OFF. If the skipping OFF mode (hereinafter, "skipping mode 0") is selected, all lines of the white reference data are stored in the buffer memory 6. The skipping ON mode includes three modes, i.e., a skipping mode 1, a skipping mode 2, and a skipping mode 3, with different skipping ratios.

In the skipping mode 1, one out of four lines of the white reference data is stored in the buffer memory 6; in the skipping mode 2, one out of eight lines is stored; and in the skipping mode 3, one out of 16 lines is stored.

Figure 3:
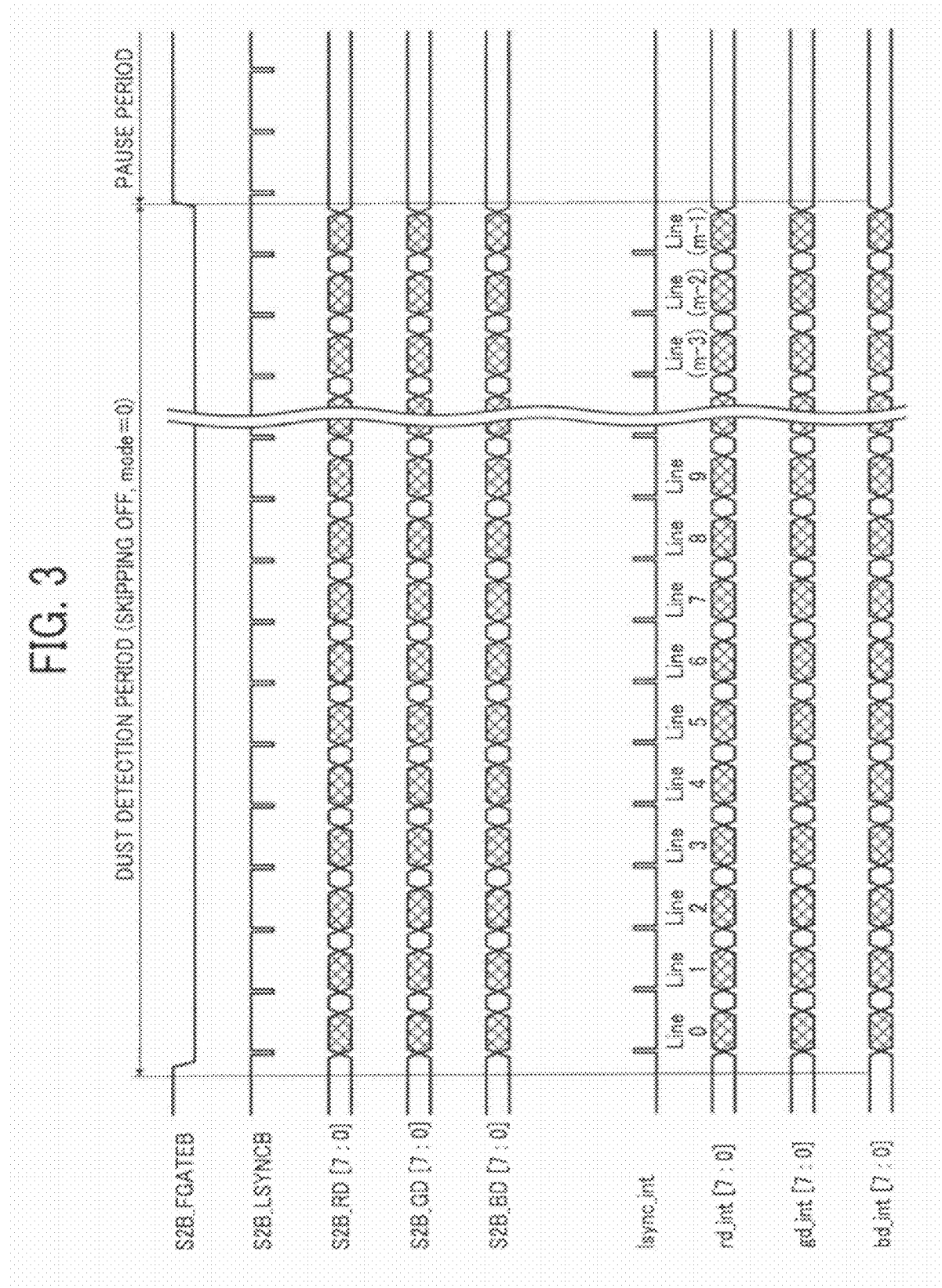
FIG. 3 is a timing chart illustrating timing when the buffer memory controller receives dust detection data and sends the received dust detection data to a buffer memory in a skipping mode 0 according to the first embodiment.
Figure 4:
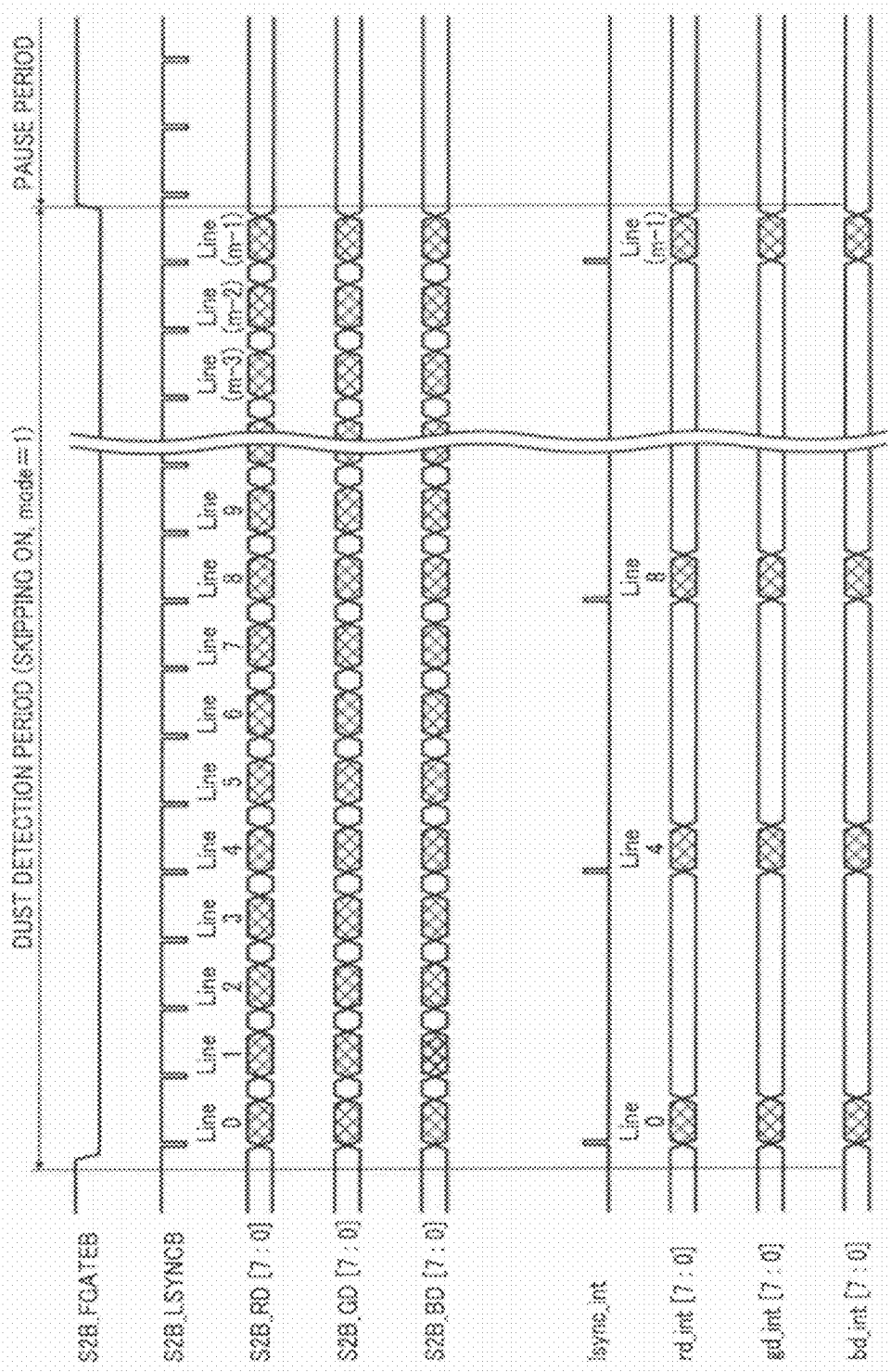
FIG. 4 is a timing chart illustrating timing when the buffer memory controller receives the dust detection data and sends the received dust detection data to the buffer memory in a skipping mode 1 according to the first embodiment.

FIGS. 3 to 5 are timing charts illustrating timing when the buffer memory controller 5 receives the dust detection data from either the front surface sensor board unit 2 or the rear surface sensor board unit 4 and sends the received dust detection data to the buffer memory 6 in the image processing apparatus 100.

The skipping mode 0 is shown in FIG. 3; the skipping mode 1 is shown in FIG. 4; and the skipping mode 2 is shown in FIG. 5.

The signals of the dust detection data and the image data are active while an S2B_FGATEB signal is low. During the dust detection period, the white reference data (i.e., dust detection data) is sent line by line each time an S2B_LSYNCB signal is turned to low. When the pause period has passed, the image-data input period starts. The image data is sent during the image-data input period. The dust detection data is inactive when the dust detection mode is OFF. The dust detection data is, off course, active when the dust detection mode is ON.

The white reference data is sent in a form of the RGB signals including an S2B_RD[7:0] signal indicative of the red signal, an S2B_GD[7:0] signal indicative of the green signal, and an S2B_BD[7:0] signal indicative of the blue signal.

When a high lsync_int signal is input, the RGB signals of the white reference data are sent from the buffer memory controller 5 to the buffer memory 6. The RGB signals that are sent from the buffer memory controller 5 to the buffer memory 6 include an rd_int[7:0] signal indicative of the red signal, an gd_int[7:0] signal indicative of the green signal, and an bd_int[7:0] signal indicative of the blue signal.

In the skipping mode 0 shown in FIG. 3, the buffer memory controller 5 stores all of the RGB signals of the white reference data in the buffer memory 6. That is, the buffer memory controller 5 turns the lsync_int signal to high each time when the S2B_LSYNCB signal is turned to low.

In the skipping mode 1 shown in FIG. 4, the buffer memory controller 5 stores a part of the RGB signals of the white reference data in the buffer memory 6 so that one out of four lines is stored. That is, the buffer memory controller 5 turns the lsync_int signal to high one out of four times when the S2B_LSYNCB signal is turned to low.

In the skipping mode 2 shown in FIG. 5, the buffer memory controller 5 stores a part of the RGB signals of the white reference data in the buffer memory 6 so that one out of eight lines is stored. That is, the buffer memory controller 5 turns the lsync_int signal to high one out of eight times when the S2B_LSYNCB signal is turned to low.

FIG. 6 is a flowchart of a storing process according to the first embodiment in which the buffer memory controller 5 stores the dust detection data and the image data received from either the front surface sensor board unit 2 or the rear surface sensor board unit 4 in the buffer memory 6.

The user selects the dust detection mode to ON/OFF and the skipping mode to one of the skipping modes 0 to 3 by manipulating the operation panel 17. The settings of the dust detection mode and the skipping mode are stored in a register (not shown) incorporated in the buffer memory controller 5.

The buffer memory controller 5 determines whether the dust detection mode is ON (Step S1). If the dust detection mode is ON (Yes at Step S1), the buffer memory controller 5 is on standby until the S2B_FGATEB signal is asserted (i.e., turned to low)(No at Step S2). When the S2B_FGATEB signal is asserted (Yes at Step S2), the buffer memory controller 5 determines whether the skipping mode is ON (Step S3).

It the skipping mode is ON (Yes at Step S3), the buffer memory controller 5 repeatedly generates the lsync_int signal in such a manner corresponding to the specified one out of the skipping modes 1 to 3 until the S2B_FGATEB signal is negated (Yes at Step S6), so that specified lines are skipped from the dust detection data. Thus, the buffer memory controller 5 stores the dust detection data in the buffer memory 6 (Step S4).

If the skipping mode is OFF (No at Step S3), the buffer memory controller 5 repeatedly generates the lsync_int signal each time when the S2B_LSYNCB signal is turned to high until the S2B_FGATEB signal is negated (Yes at Step S6). Thus, the buffer memory controller 5 stores the dust detection data in the buffer memory 6 (Step S5).

In this manner, the buffer memory controller 5 finishes storing the dust detection data (Step S7). After that during a period when the S2B_FGATEB signal is asserted again (Yes at Step S8) and when the S2B_FGATEB signal is negated (Yes at Step S10), the buffer memory controller 5 stores the image data in the buffer memory 6 in synchronized with the S2B_LSYNCB signal (Step S9). In other words, if the dust detection mode is OFF, the buffer memory controller 5 stores only the image data in the buffer memory 6.

The storing process is bifurcated into Steps S4 and S5 whether the dust detection data is to be skipped (see (1) of FIG. 6). If the dust detection data is not to be skipped, the dust detection data is stored as it is. On the other hand, if the dust detection data is to be skipped, the dust detection data is skipped by the skipping ratio corresponding to the specified skipping mode, and the dust detection data is stored in the buffer memory 6. Thereafter, the image data is stored in the buffer memory 6 at Step S9 (see (2)).

FIGS. 7A to 7D are schematic diagrams illustrating contents of the dust detection data stored in the buffer memory 6 in various skipping modes.

FIG. 7A depicts the skipping mode 0 where 0 is stored under control of the process controller 22 in a mode register (not shown) incorporated in the first-LSYNC control unit 501 and the second-LSYNC control unit 502, so that the dust detection data is stored in the buffer memory 6 without skipping.

FIG. 7B depicts the skipping mode 1 where "1" is stored in the mode register. The dust detection data is skipped at the skipping ratio corresponding to the skipping mode 1 so that one out of four lines is stored in the buffer memory 6. More particularly, although lines 0, 1, 2, 3, . . . are input as the dust detection data, only lines 0, 4, 8, . . . are stored in the buffer memory 6. Alternatively, it can be configured to store an average value of lines 0 to 3, an average value of lines 4 to 7, . . . in the buffer memory 6.

Figure 7C:
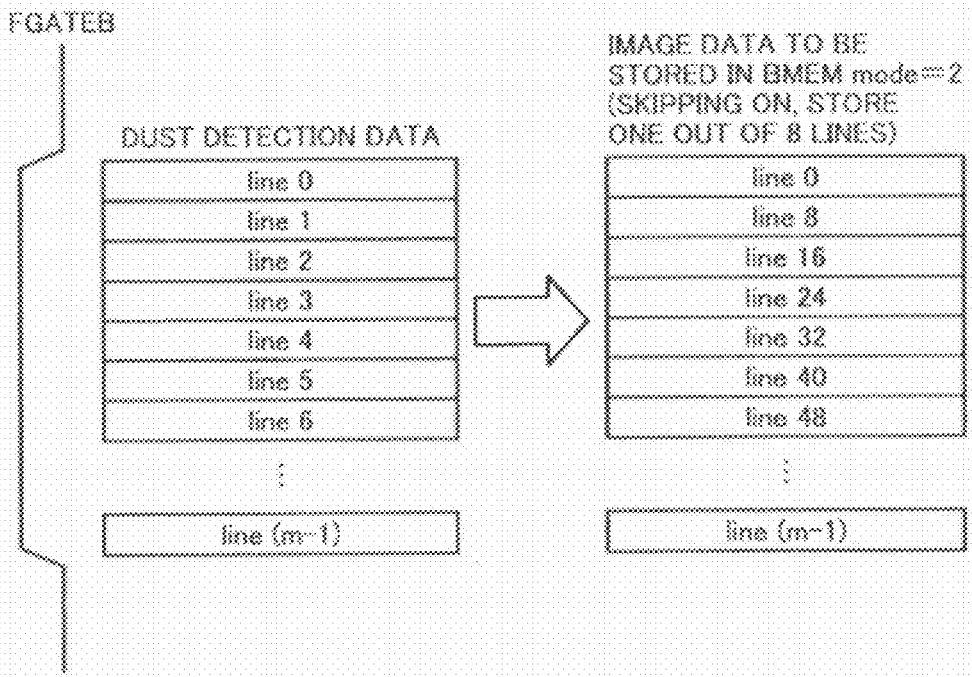
FIG. 7C is a schematic diagram illustrating contents of the dust detection data stored in the buffer memory in the skipping mode 2.

FIG. 7C depicts the skipping mode 2 where "2" is stored in the mode register. The dust detection data is skipped at the skipping ratio corresponding to the skipping mode 2 so that one out of eight lines is stored in the buffer memory 6. More particularly, although lines 0, 1, 2, 3, . . . are input as the dust detection data, only lines 0, 8, 16, . . . are stored in the buffer memory 6. Alternatively, it can be configured to store an average value of lines 0 to 7, an average value of lines 8 to 15, . . . in the buffer memory 6.

Figure 7D:
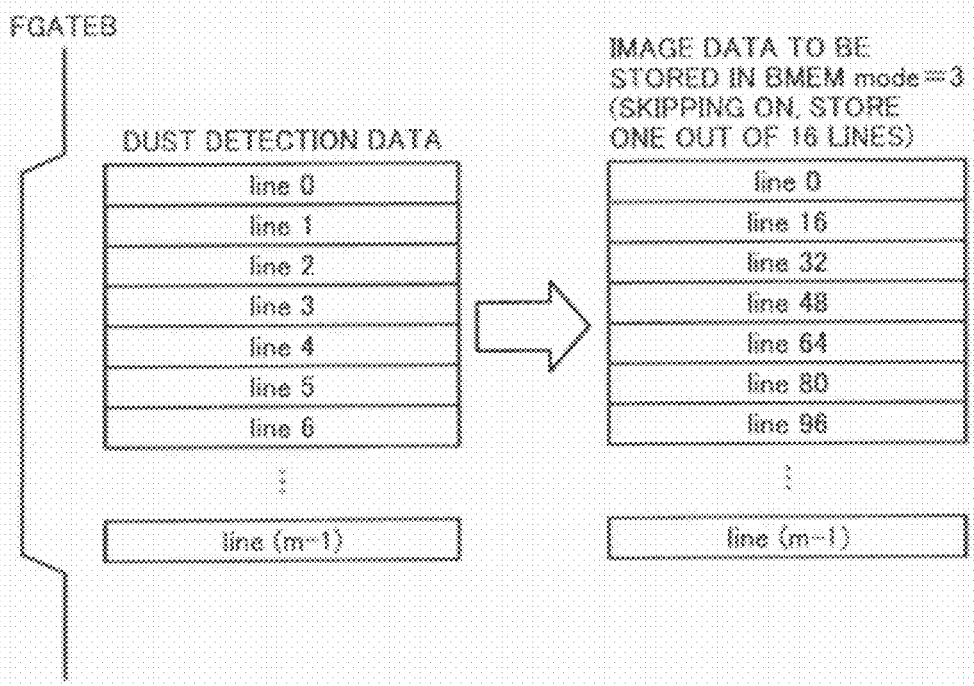
FIG. 7D is a schematic diagram illustrating contents of the dust detection data stored in the buffer memory in the skipping mode 3.

FIG. 7D depicts the skipping mode 3 where "3" is stored in the mode register. The dust detection data is skipped at the skipping ratio corresponding to the skipping mode 3 so that one out of 16 lines is stored in the buffer memory 6. More particularly, although lines 0, 1, 2, 3, . . . are input as the dust detection data, only lines 0, 16, 32, . . . are stored in the buffer memory 6. Alternatively, it can be configured to store an average value of lines 0 to 15, an average value of lines 16 to 31, . . . in the buffer memory 6.

Figure 8:
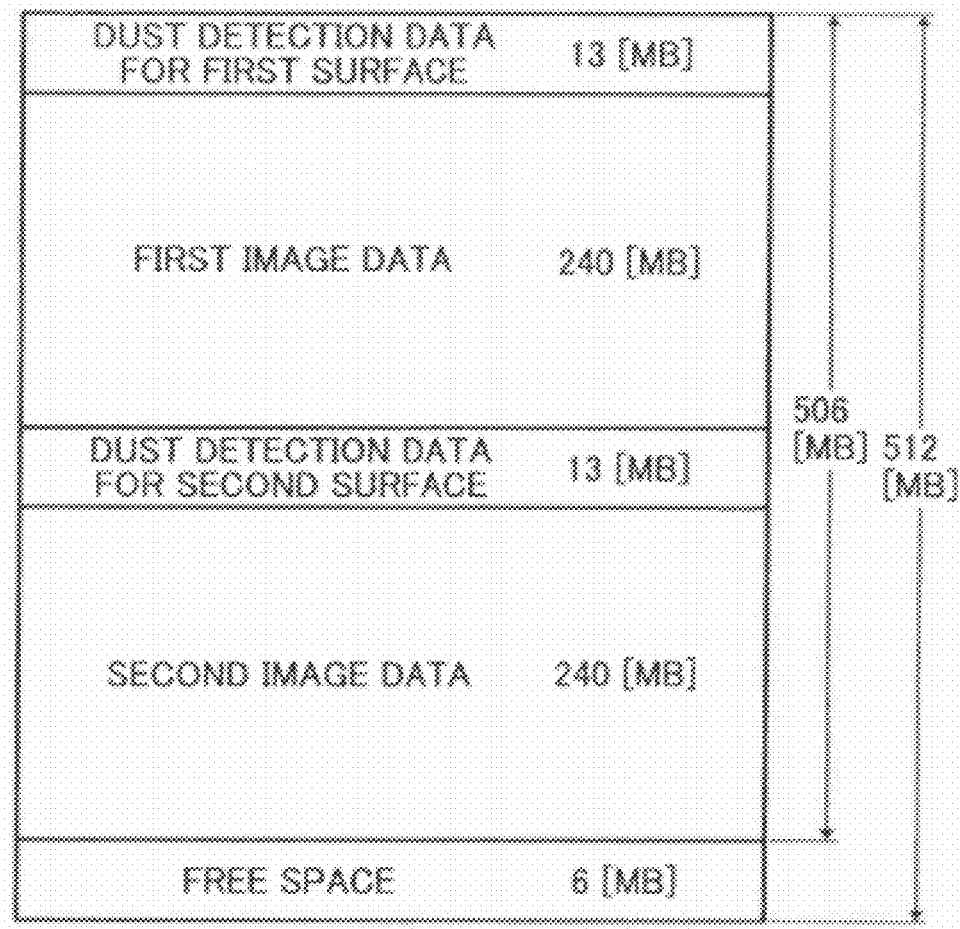
FIG. 8 is a schematic diagram for explaining required capacity of the buffer memory in the skipping mode 1.

FIG. 8 is a schematic diagram for explaining the required capacity of the buffer memory 6 in the skipping mode 1, i.e., where the dust detection data that is skipped to one fourth is stored in the buffer memory 6.

Figure 46:
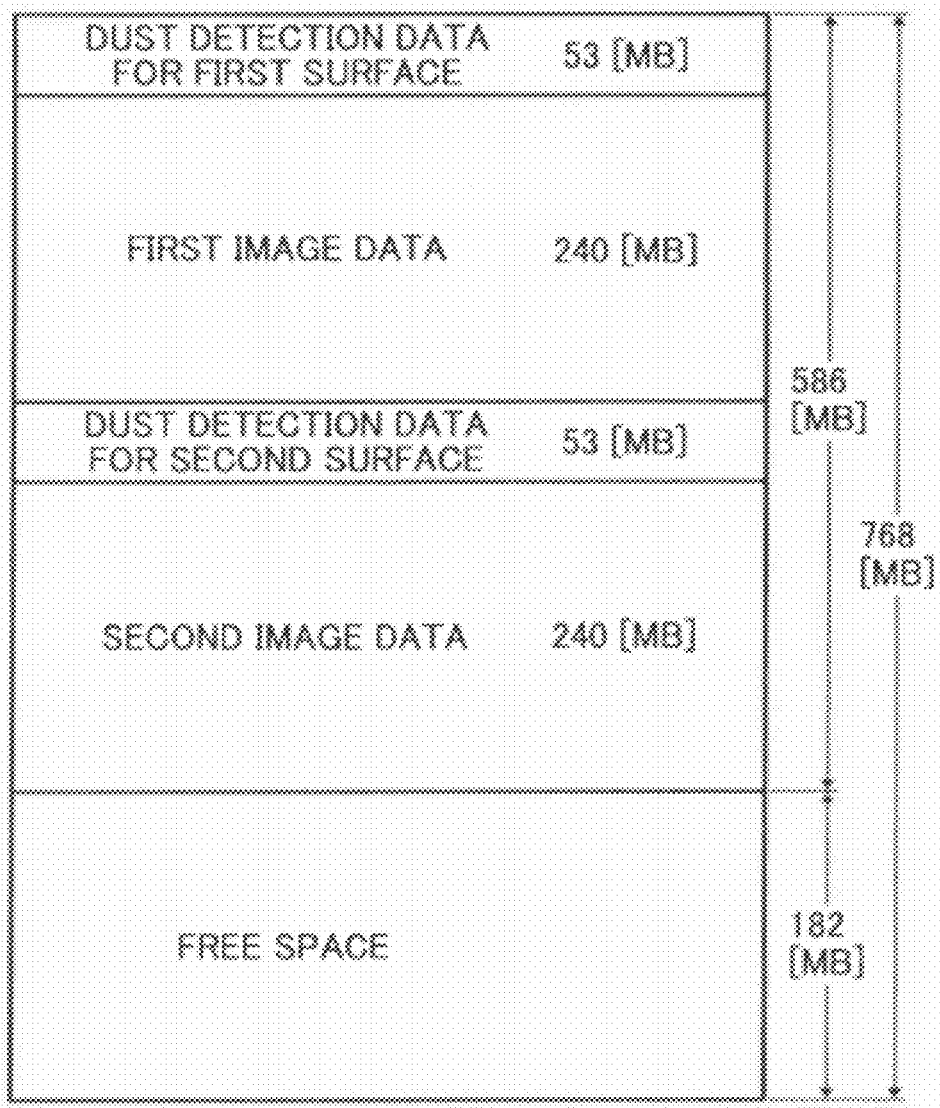
FIG. 46 is a schematic diagram for explaining the required capacity of the buffer memory for storing therein the dust detection data and the image data in the conventional image processing apparatus.
Figure 47:
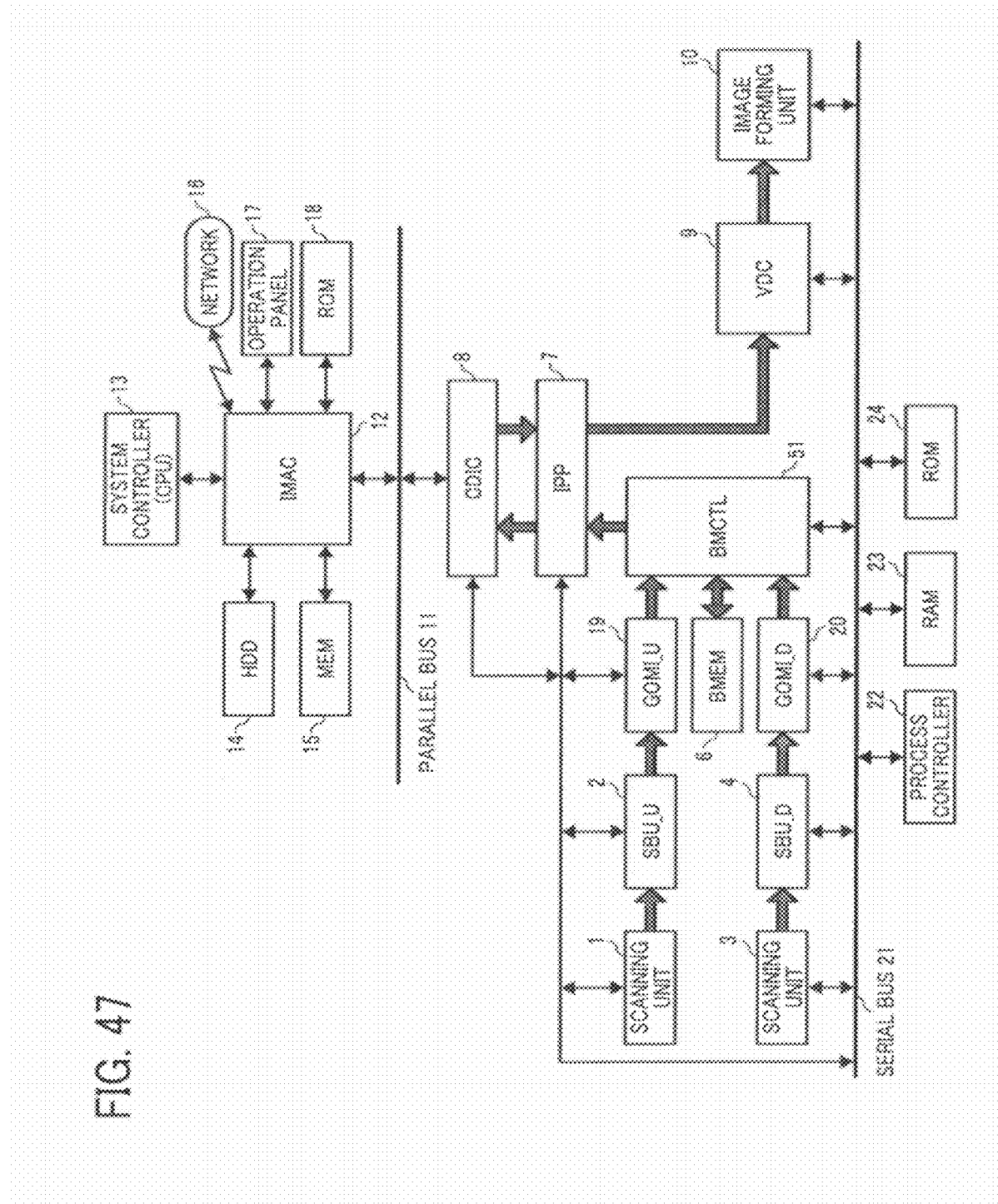
FIG. 47 is a block diagram of another conventional image processing apparatus.
Figure 48:
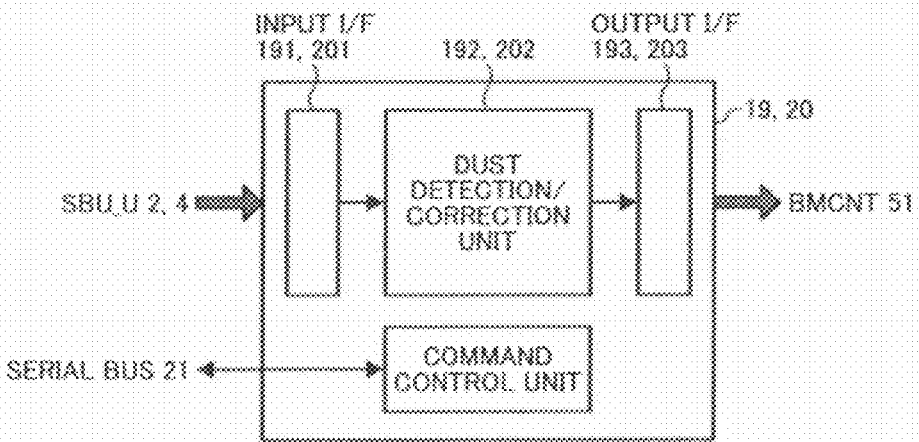
FIG. 48 is a block diagram of a dust detection unit shown in FIG. 47.
Figure 49:
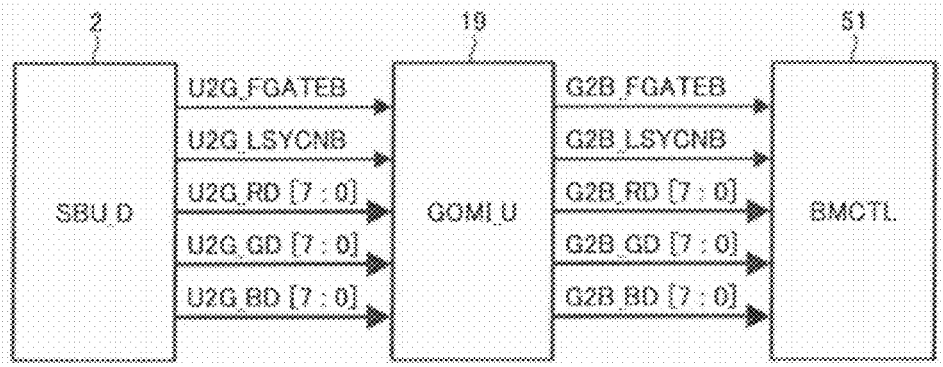
FIG. 49 is a schematic diagram for explaining signals that are sent from a front surface sensor board unit to the dust detection unit, and signals that are sent from the dust detection unit to the buffer memory controller.
Figure 50:
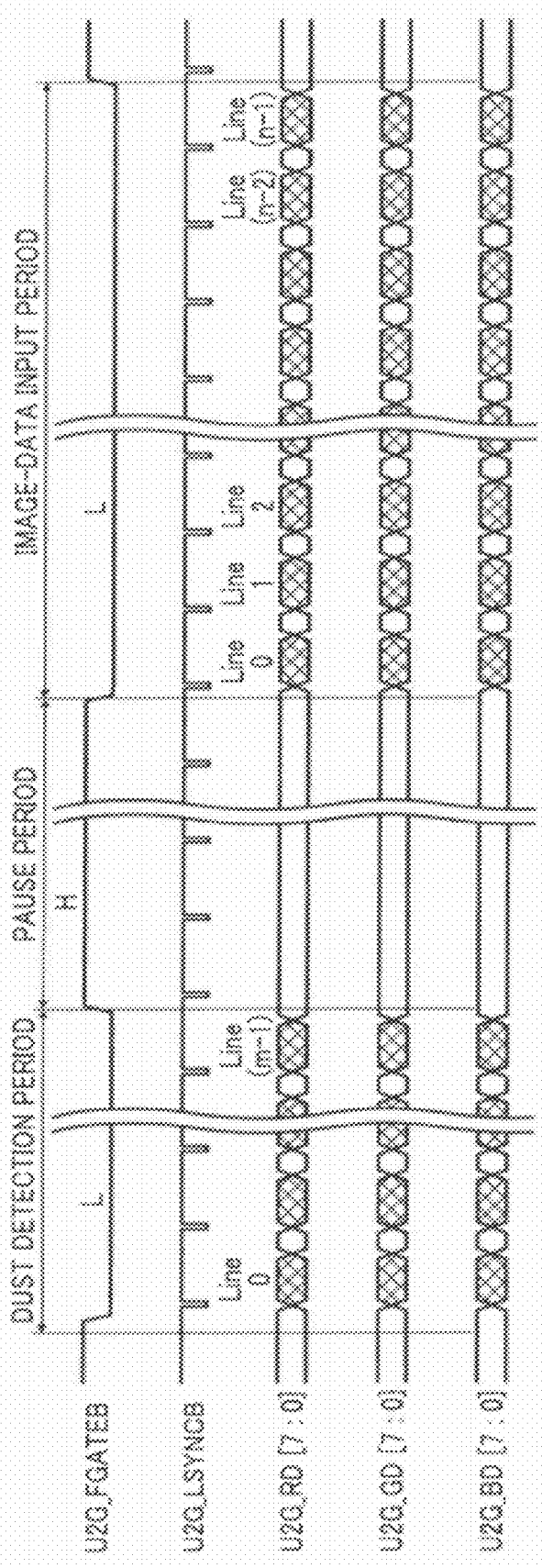
FIG. 50 is a timing chart illustrating timing when the signals shown in FIG. 49 are sent from the front surface sensor board unit to the dust detection unit.
Figure 51:
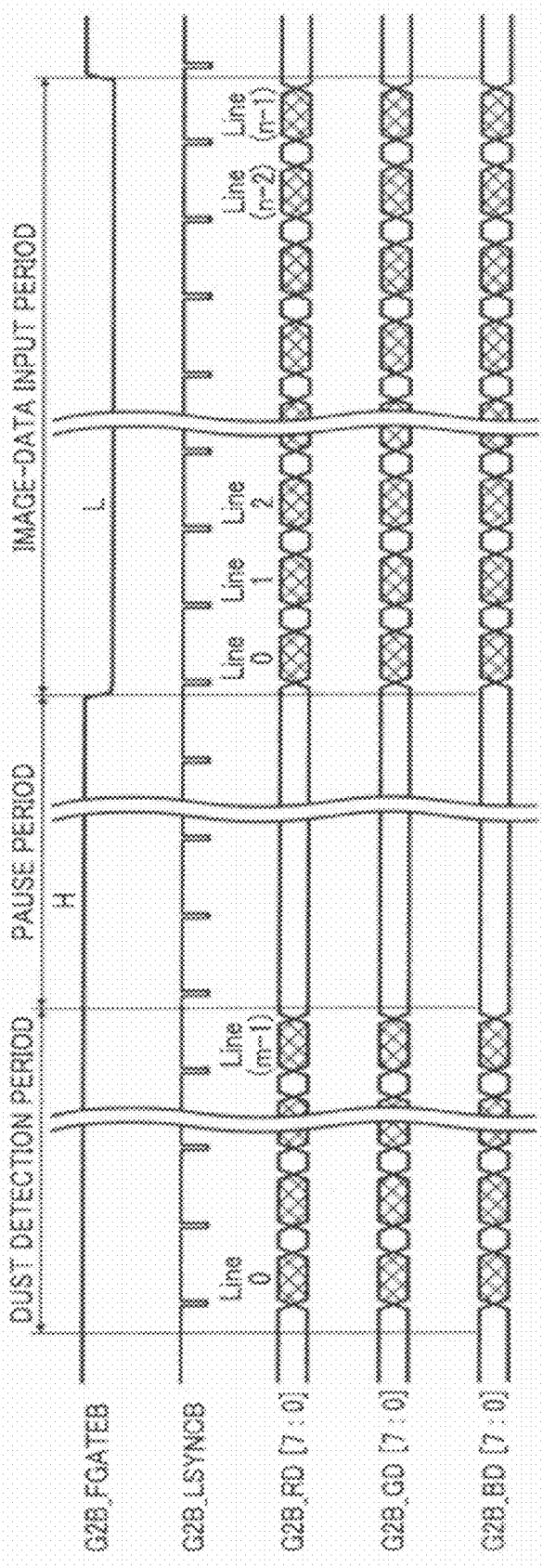
FIG. 51 is a timing chart illustrating timing when the signals shown in FIG. 49 are sent from the dust detection unit to the buffer memory controller.

As compared to the required capacity shown in FIG. 46, each of the dust detection data for the front surface and the dust detection data for the rear surface is reduced to one fourth, i.e., from 53 megabytes to 13 megabytes, and thus the total required capacity is reduced to 506 megabytes. In other words, the total required capacity is reduced from 768 megabytes by 256 megabytes to 506 megabytes, which makes it possible to reduce the memory costs to two thirds. The reduction amount of 256 megabytes is equivalent to four 512-megabit double data rate 2 (DDR2) memories that have been widely used, and the reduction costs will be several tens of thousands yen. This reduction costs is remarkable for the controller used in the MFP.

An image processing apparatus 200 according to a second embodiment is described below. In the second embodiment, the buffer memory controller 5 stores the dust detection data and the image data in the buffer memory 6 with a simpler manner. The structure of the image processing apparatus 200 and a scanner used in the image processing apparatus 200 is same as the structure of the image processing apparatus 100 shown in FIG. 1 and the conventional scanner shown in FIG. 25.

Figure 9:
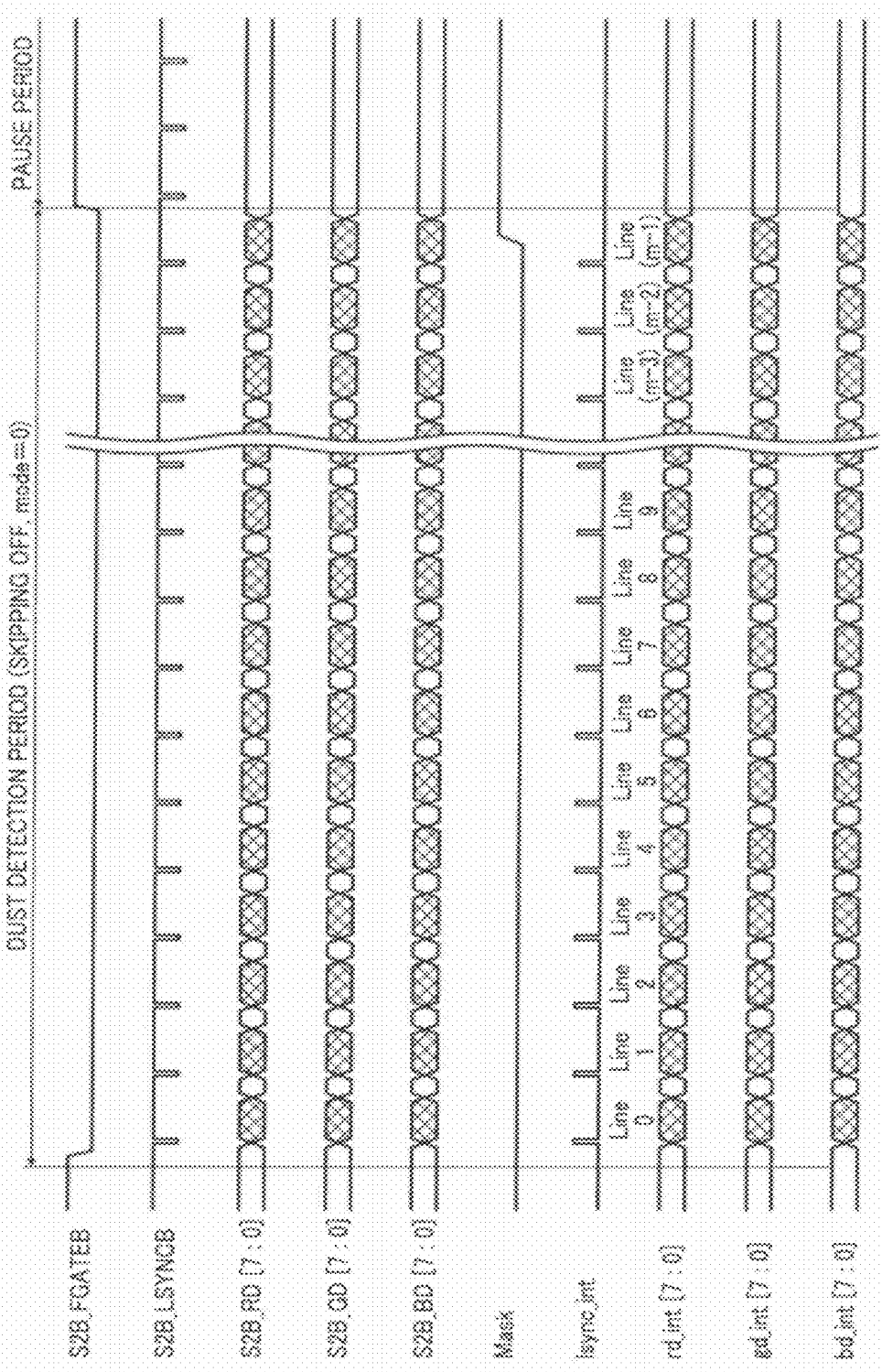
FIG. 9 is a timing chart illustrating timing when a buffer memory controller according to a second embodiment of the present invention receives the dust detection data and sends the received dust detection data to the buffer memory in a skipping mode 0.
Figure 10:
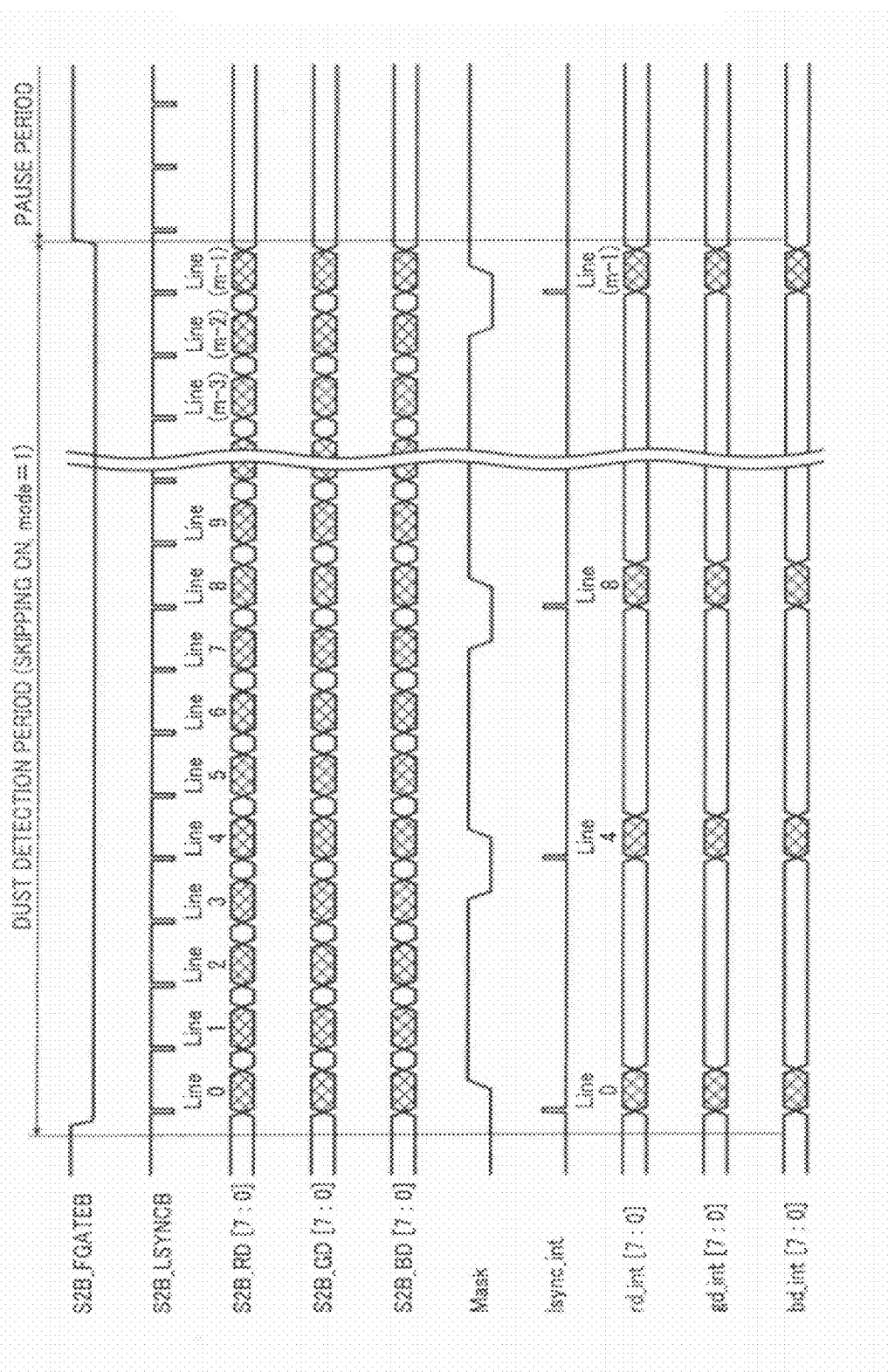
FIG. 10 is a timing chart illustrating timing when the buffer memory controller receives the dust detection data and sends the received dust detection data to the buffer memory in the skipping mode 1 according to the second embodiment.
Figure 11:
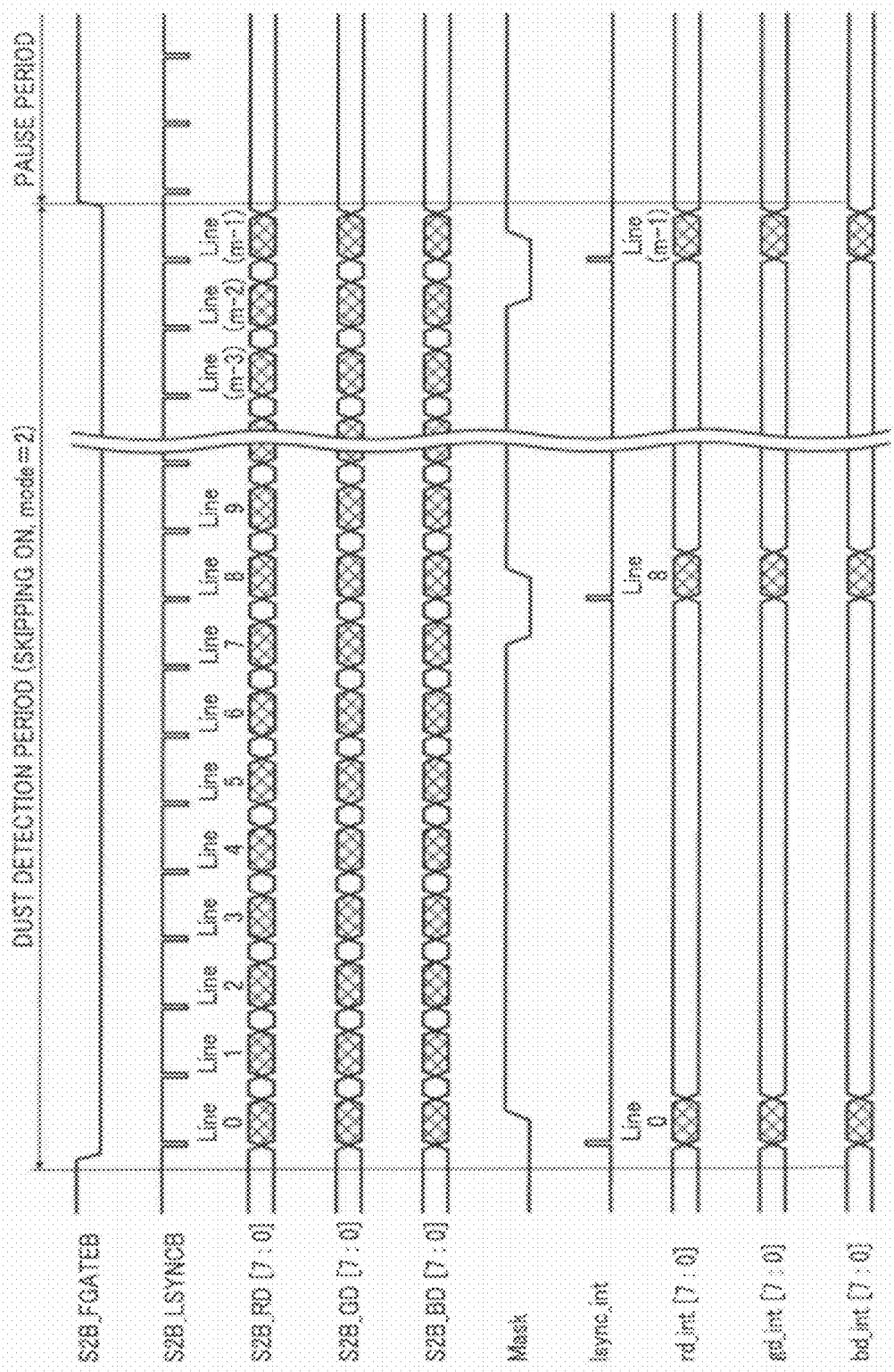
FIG. 11 is a timing chart illustrating timing when the buffer memory controller receives the dust detection data and sends the received dust detection data to the buffer memory in the skipping mode 2 according to the second embodiment.

FIGS. 9 to 11 are timing charts illustrating timing when the buffer memory controller 5 receives the dust detection data from either the front surface sensor board unit 2 or the rear surface sensor board unit 4 and sends the received dust detection data to the buffer memory 6 in the image processing apparatus 200.

The skipping mode 0 is shown in FIG. 9; the skipping mode 1 is shown in FIG. 10; and the skipping mode 2 is shown in FIG. 11.

A mask signal shown in FIGS. 9 to 11 is used to select line data to be stored in the buffer memory 6. When the mask signal is high, the S2B_LSYNCB signal is masked. The lsync_int signal is synchronized with the masked S2B_LSYNCB signal. The data is stored in the buffer memory 6 when the lsync_int signal is input. The lsync_int signal is calculated by:

lsync_int=!S2B_LSYNCB&!Mask where signal with symbol of ! is an inversion signal, and symbol of & means AND.

Figure 12:
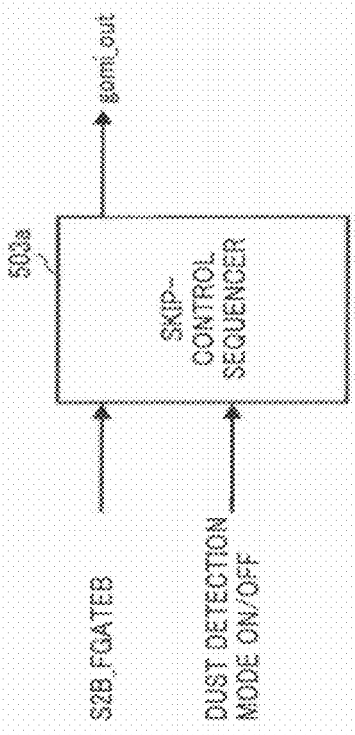
FIG. 12 is a schematic diagram for explaining input and output of a skipping-control sequencer according to the second embodiment.

FIG. 12 is a schematic diagram for explaining input and output of a skipping-control sequencer 503a incorporated in each of the first-LSYNC control unit 501 and the second-LSYNC control unit 502. The skipping-control sequencer 503a receives the S2B_FGATEB signal and data indicative ON/OFF of the dust detection mode as input signals, and outputs a gomi_out signal for generating the lsync_int signal at a timing corresponding to the specified skipping mode.

Figure 15:
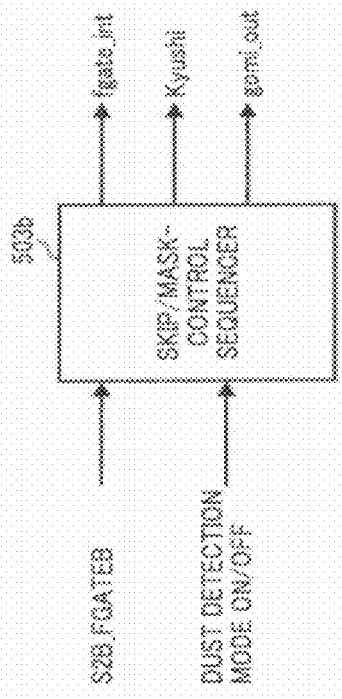
FIG. 15 is a schematic diagram for explaining input and output of another skipping-control sequencer according to the second embodiment.

FIG. 15 is a schematic diagram for explaining input and output of a skipping/mask-control sequencer 503b incorporated in each of the first-LSYNC control unit 501 and the second-LSYNC control unit 502 instead of the skipping-control sequencer 503a. The skipping/mask-control sequencer 503b outputs a fgate_int signal and a Kyushi signal in addition to the gomi_out signal. The Kyushi signal is high (i.e., Kyushi=1) during the pause period.

Figure 13:
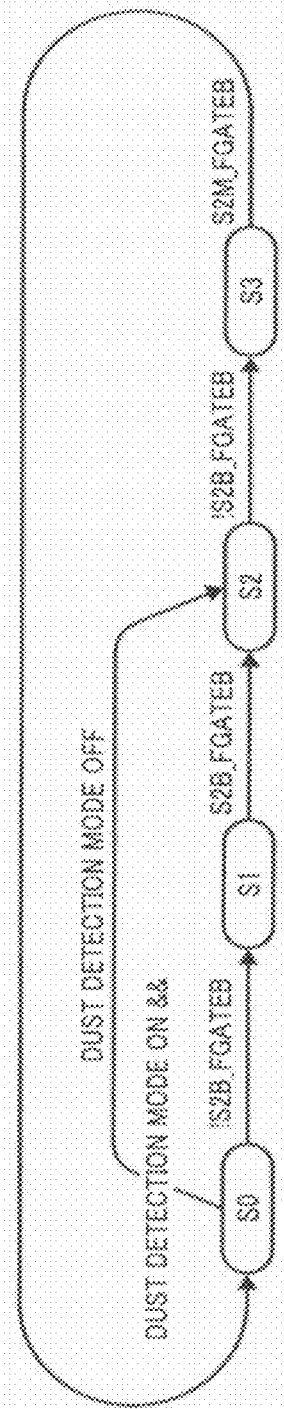
FIG. 13 is a schematic diagram for explaining various states of the skipping-control sequencer shown in FIG. 12.

FIG. 13 is a schematic diagram for explaining various states of the skipping-control sequencer 503a. A state 0 (S0) is a default state. Upon receiving data indicative of the dust detection mode of ON (i.e., dust detection period) and the low S2B_FGATEB signal (i.e., !S2B_LSYNCB=H), the skipping-control sequencer 503a turns to a state 1 (S1) and thereby the dust detection period starts. The skipping-control sequencer 503a outputs the gomi_out signal in the state 1.

Upon receiving the high S2B_FGATEB signal (i.e., !S2B_LSYNCB=L) while being in the state 1, the skipping-control sequencer 503a turns to a state 2 (S2) and thereby the dust detection period ends. Upon receiving data indicative of the dust detection mode of OFF while being in the state 0, the skipping-control sequencer 503a turns to the state 2. Upon receiving the high inverted S2B_LSYNCB signal (i.e., S2B_FGATEB=L) while being in the state 2, the skipping-control sequencer 503a turns to a state 3 (S3) and thereby the dust detection period starts.

Figure 16:
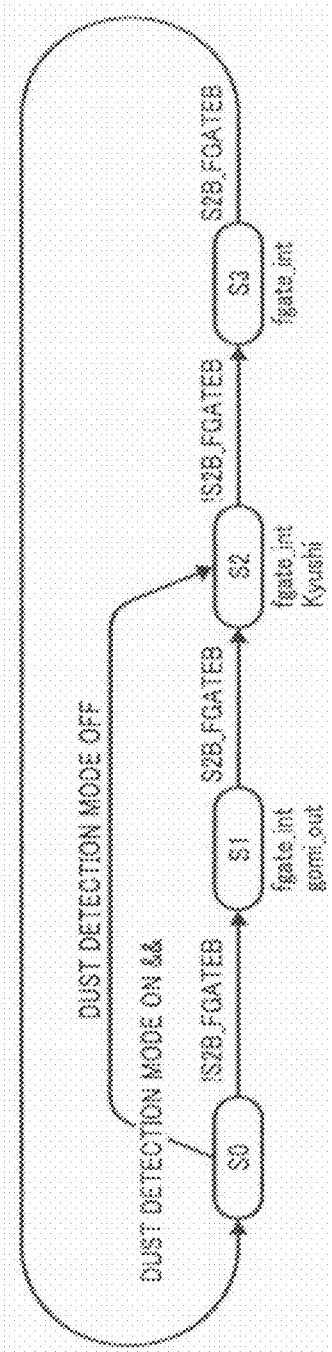
FIG. 16 is a schematic diagram for explaining various states of the skipping-control sequencer shown in FIG. 15.

FIG. 16 is a schematic diagram for explaining various states of the skipping/mask-control sequencer 503b.

Figure 14:
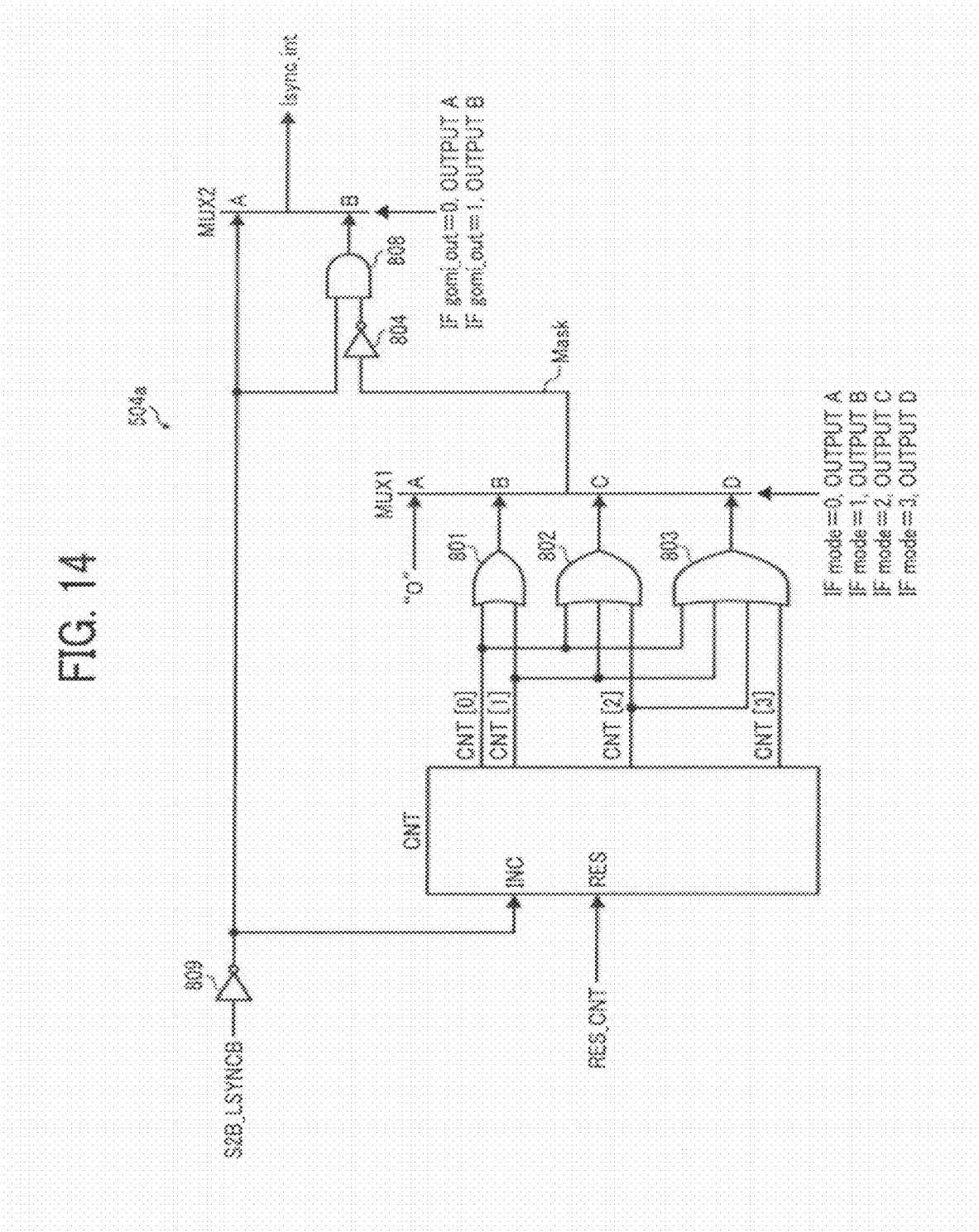
FIG. 14 is a schematic diagram of a control circuit for controlling the skipping-control sequencer shown in FIG. 12.

FIG. 14 is a schematic diagram of a control circuit 504a for controlling the skipping-control sequencer 503a. The control circuit 504a is incorporated in each of the first-LSYNC control unit 501 and the second-LSYNC control unit 502. In the control circuit 504a, an inverter 809 inverts the received S2B_LSYNCB signal and outputs the inverted S2B_LSYNCB signal to a multiplexer MUX2 and a counter CNT. The counter CNT additionally receives a RES_CNT signal as a reset signal.

The counter CNT outputs four signals including CNT[0], CNT[1], CNT[2], and CNT[3] to a two-input OR gate 801, a three-input OR gate 802, and a four-input OR gate 803. A multiplexer MUX1 receive 0 and outputs of each of the two-input OR gate 801, the three-input OR gate 802, and the four-input OR gate 803, and outputs one of the received signals as the mask signal corresponding to the specified skipping mode.

In a case of the skipping mode 0, the multiplexer MUX1 selects 0 (output A) as the mask signal. In a case of the skipping mode 1, the multiplexer MUX1 selects an output B that is received from the two-input OR gate 801. In a case of the skipping mode 2, the multiplexer MUX1 selects an output C that is received from the three-input OR gate 802. In a case of the skipping mode 3, the multiplexer MUX1 selects an output C that is received from the four-input OR gate 803.

The multiplexer MUX1 outputs the mask signal to an inverter 804. The inverter 804 inverts the mask signal, and outputs the inverted mask signal to a two-input AND gate 808. The two-input AND gate 808 receives the inverted mask signal from the inverter 804 and the inverted S2B_LSYNCB signal from the inverter 809, and outputs an logical addition between them. The multiplexer MUX2 receives the inverted S2B_LSYNCB signal from the inverter 809 and the logical addition from the two-input AND gate 808, and outputs either the inverted S2B_LSYNCB signal or the logical addition as the lsync_int signal.

More particularly, if the gomi_out signal is 0, i.e., out of the dust detection period, the multiplexer MUX2 outputs the inverted S2B_LSYNCB signal (output A) as the lsync_int signal. As a result, the white reference data is not skipped.

On the other hand, if the gomi_out signal is 1, i.e., during the dust detection period, the multiplexer MUX2 outputs the logical addition (output B) as the lsync_int signal. The output timing of the lsync_int signal depends on the specified skipping mode. As a result, the white reference data is skipped at the skipping ratio corresponding to the specified skipping mode.

FIG. 17 is a schematic diagram of a control circuit 504b for controlling the skipping/mask-control sequencer 503b.

The multiplexer MUX2 in the control circuit 504b, in contrast to the control circuit 504a, receives the Kyushi signal in addition to the inverted S2B_LSYNCB signal and the logical addition. More particularly, if the gomi_out is 1, i.e., during the dust detection period, the multiplexer MUX2 outputs the logical addition (output C) as the lsync_int signal. As a result, the white reference data is skipped at the skipping ratio corresponding to the specified skipping mode.

If the Kyushi signal is 1, i.e., during the pause period, the multiplexer MUX2 outputs 1 (output B) as the lsync_int signal. As a result, the white reference data is not skipped.

If the gomi_out is 0 and the Kyushi signal is 0, i.e., out of both of the dust detection period and the pause period, the multiplexer MUX2 outputs the inverted S2B_LSYNCB signal (output A) as the lsync_int signal. As a result, the white reference data is not skipped.

FIG. 18 is a table containing counter value of the counter CNT and mask signal corresponding to each line in various skipping modes.

In this manner, the first-LSYNC control unit 501 and the second-LSYNC control unit 502 controls the storing of data in the buffer memory 6 only by using the masked line synchronization signal of lsync_int. Therefore, it is unnecessary to separate the storing of the dust detection data from the storing of the image data. This makes it possible to reduce the size of the control circuit and thereby reduce the total costs.

Figure 19:
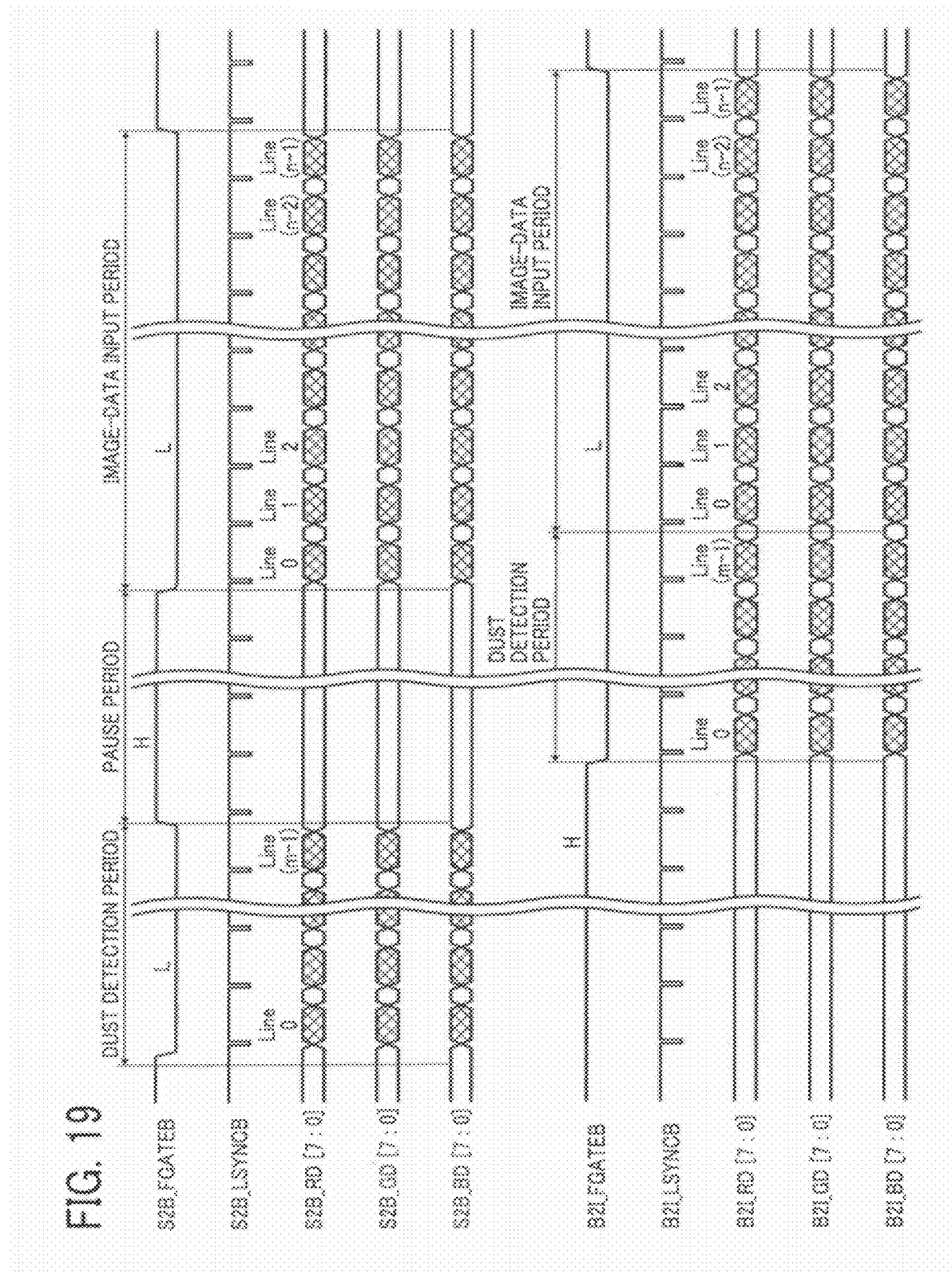
FIG. 19 is a timing chart of signals that are sent from the sensor board unit to the buffer memory controller, and signals that are sent from the buffer memory controller to the image processing processor according to the second embodiment.

FIG. 19 is a timing chart of signals that are sent from either the front surface sensor board unit 2 or the rear surface sensor board unit 4 to the buffer memory controller 5, and signals that are sent from the buffer memory controller 5 to the image processing processor 7. The signals attached with S2B at their head are sent to the buffer memory controller 5; and the signals attached with B2I at their head are sent to the image processing processor 7.

In this manner, the dust detection data and the image data are sequentially stored in the buffer memory 6. Therefore, the target dust detection data and the target image data can be sequentially read and the obtained data can be sequentially sent to the image processing processor 7 just by specifying an address of the target dust detection data.

Figure 20:
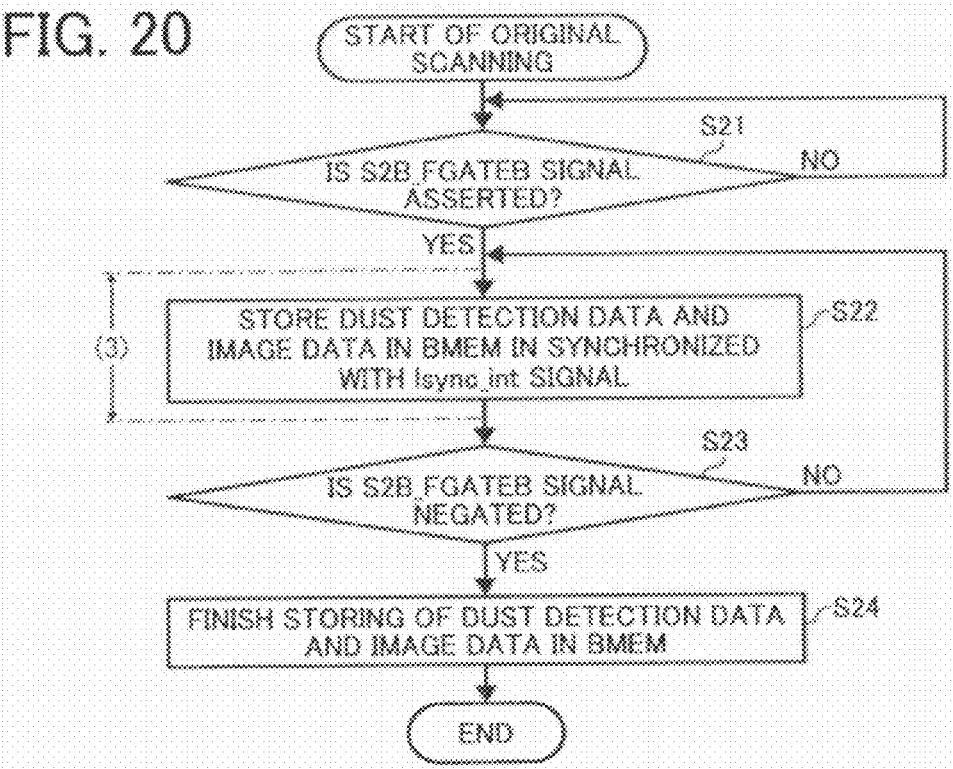
FIG. 20 is a flowchart of a storing process of storing the dust detection data and the image data in the buffer memory according to the second embodiment.

FIG. 20 is a flowchart of a storing process of storing the dust detection data and the image data in the buffer memory 6 according to the second embodiment. When the S2B_FGATEB signal is asserted (Yes at Step S21), the buffer memory controller 5 stores the dust detection data (white reference data) and the image data in the buffer memory 6 in synchronized with the lsync_int signal that is repeatedly generated in such timing corresponding to the specified skipping mode (Step S22). When the S2B_FGATEB signal is negated (Yes at Step S23), the buffer memory controller 5 finishes the storing (Step S24).

Figure 42:
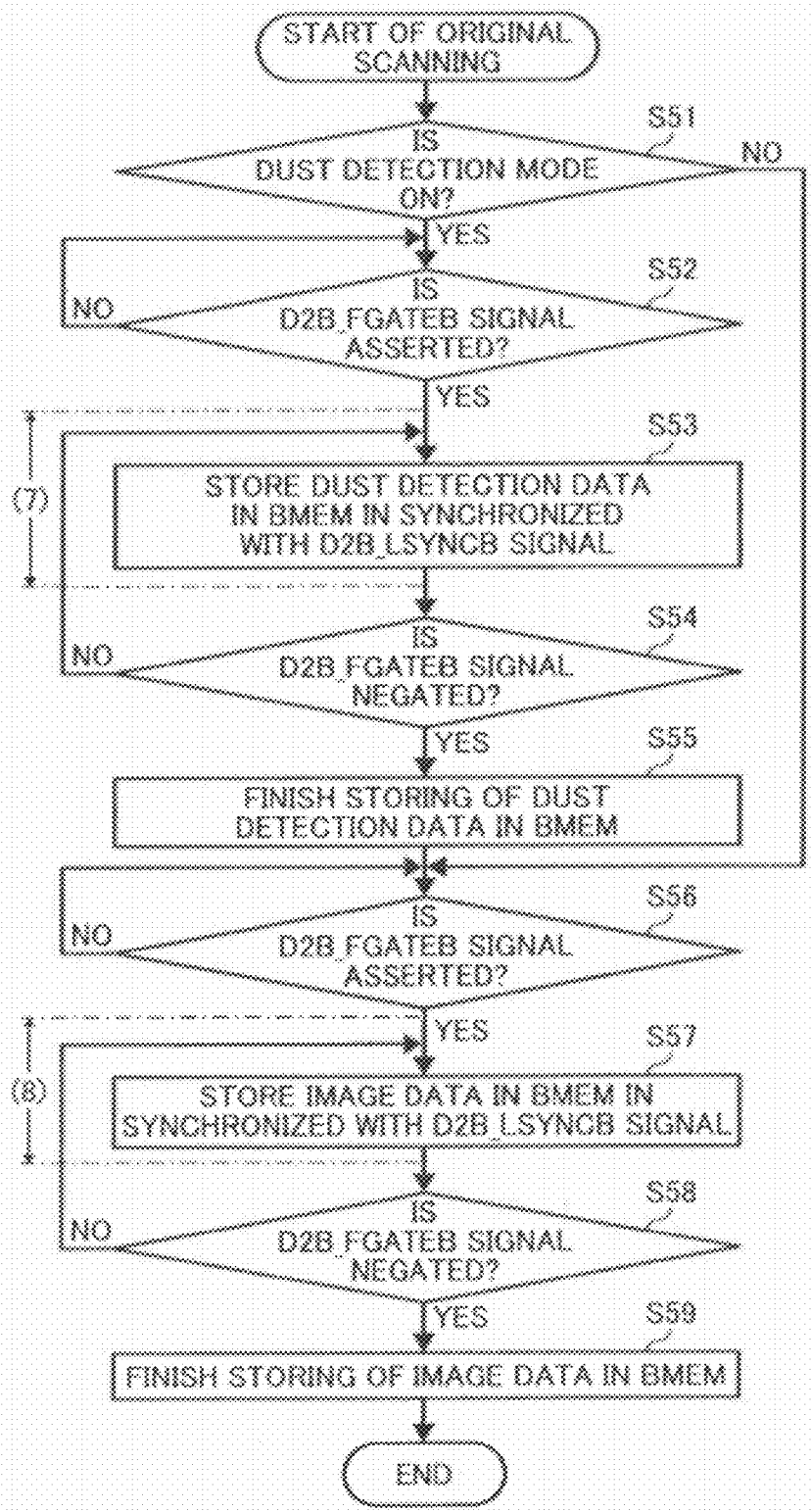
FIG. 42 is a flowchart of a single-surface storing process in which the buffer memory controller stores the white reference data and the image data in the buffer memory in the conventional image processing apparatus.

Comparing the storing process shown in FIG. 20 with the conventional storing process shown in FIG. 42, the buffer memory controller 51 separately controls the storing of the dust detection data in the buffer memory 6 and the storing of the image data in the buffer memory 6 in the conventional storing process, while the buffer memory controller 5 stores the dust detection data and the image data in the buffer memory 6 in synchronized with the lsync_int signal with the non-separated operation at Step S22 (see (3)) in the storing process according to the second embodiment. In other words, the storing process according to the second embodiment is simpler than the conventional storing process. This makes it possible to simplify the storing process, and thereby reduce the size and the costs of the circuit.

Figure 21:
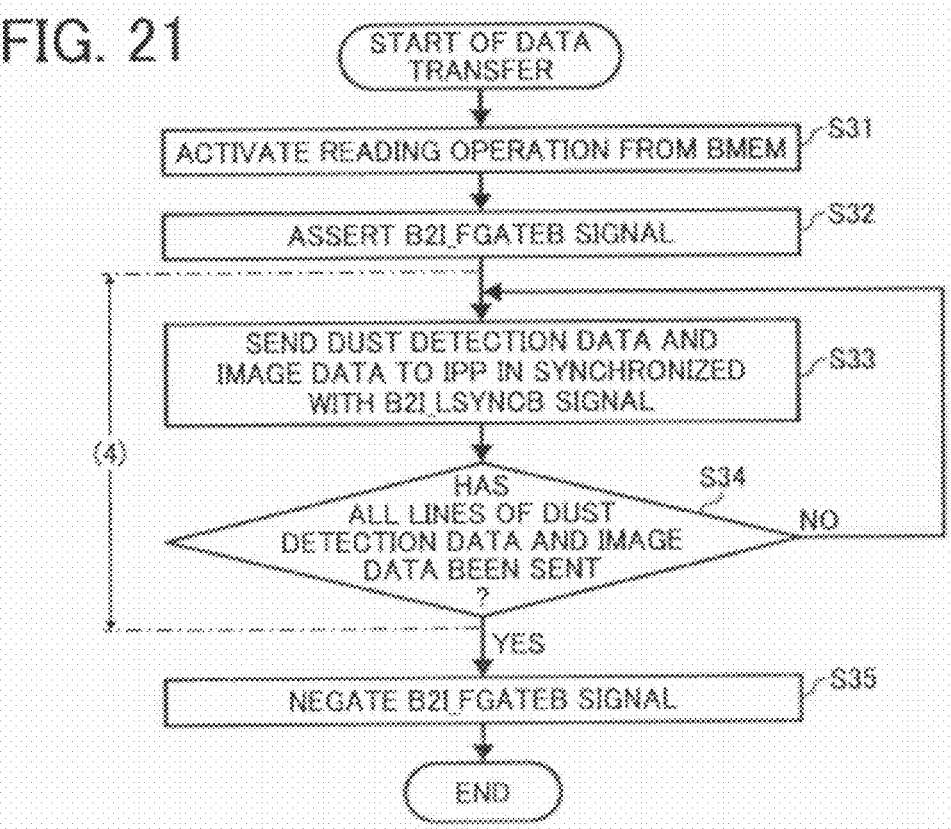
FIG. 21 is a flowchart of a single-surface reading process of reading the dust detection data and the image data from the buffer memory according to the second embodiment.

FIG. 21 is a flowchart of a single-surface reading process of reading the dust detection data and the image data from the buffer memory 6 according to the second embodiment. The buffer memory controller 5 activates reading operation from the buffer memory 6 (Step S31). The buffer memory controller 5 then asserts the B2I_FGATEB signal (i.e., turns the B2I_FGATEB signal to low)(Step S32). The buffer memory controller 5 sends the dust detection data and the image data to the image processing processor 7 in synchronized with the B2I_LSYNCB signal (Step S33). When the buffer memory controller 5 finishes sending of all lines of the dust detection data and the image data (Yes at Step S34), the buffer memory controller 5 negates the B2I_FGATEB signal (Step S35).

Figure 43:
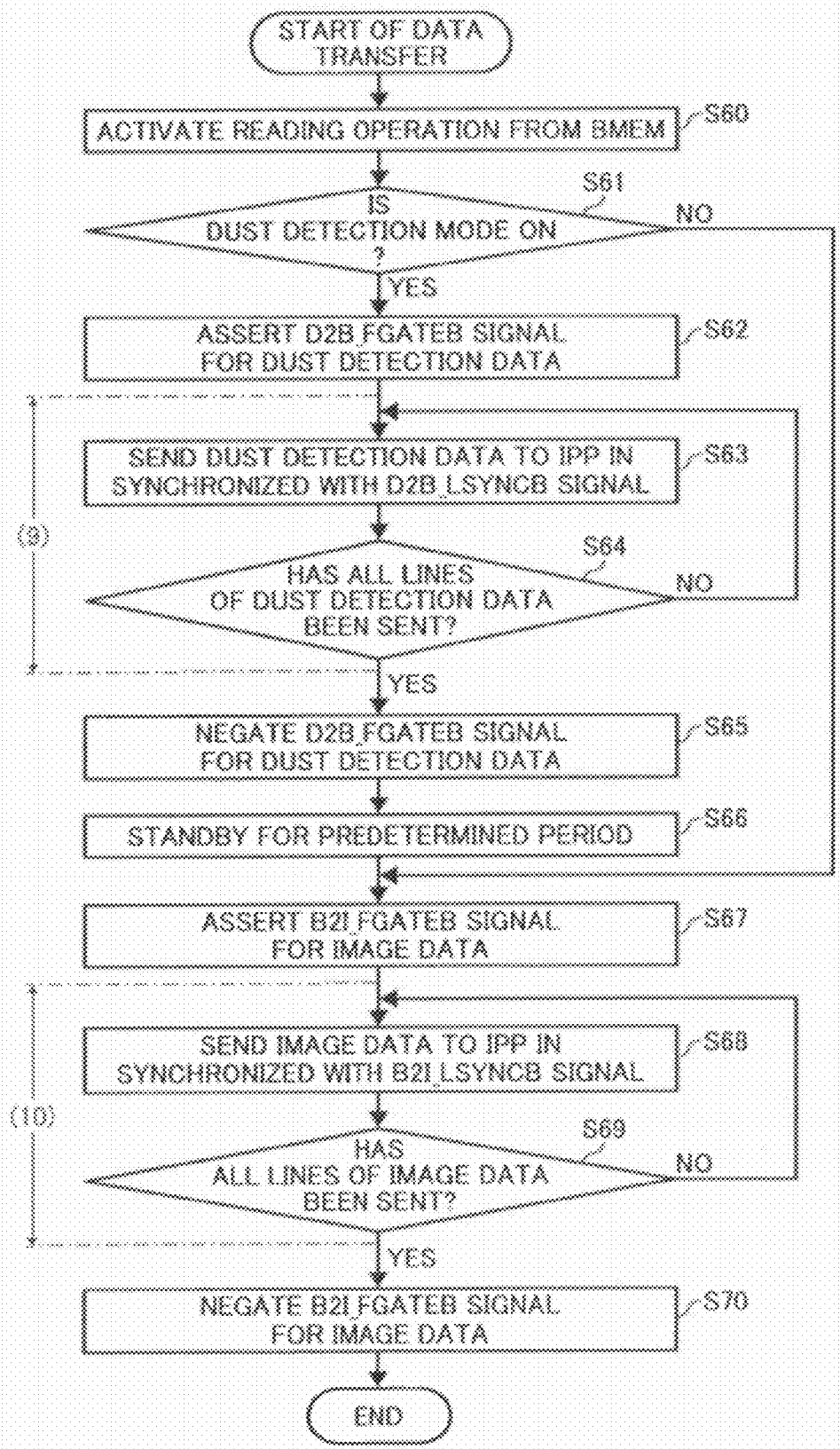
FIG. 43 is a flowchart of a single-surface reading process of reading the white reference data and the image data from the buffer memory in the conventional image processing apparatus.

Comparing the single-surface reading process shown in FIG. 21 with the conventional single-surface reading shown in FIG. 43, the buffer memory controller 51 separately controls the reading of the dust detection data from the buffer memory 6 and the reading of the image data from the buffer memory 6 in the conventional single-surface reading process, while the buffer memory controller 5 reads the dust detection data and the image data from the buffer memory 6 with the non-separated operation at Step S34 (see (4)) in the single-surface reading process according to the second embodiment. In other words, the single-surface reading process according to the second embodiment is simpler than the conventional single-surface reading process.

Figure 22:
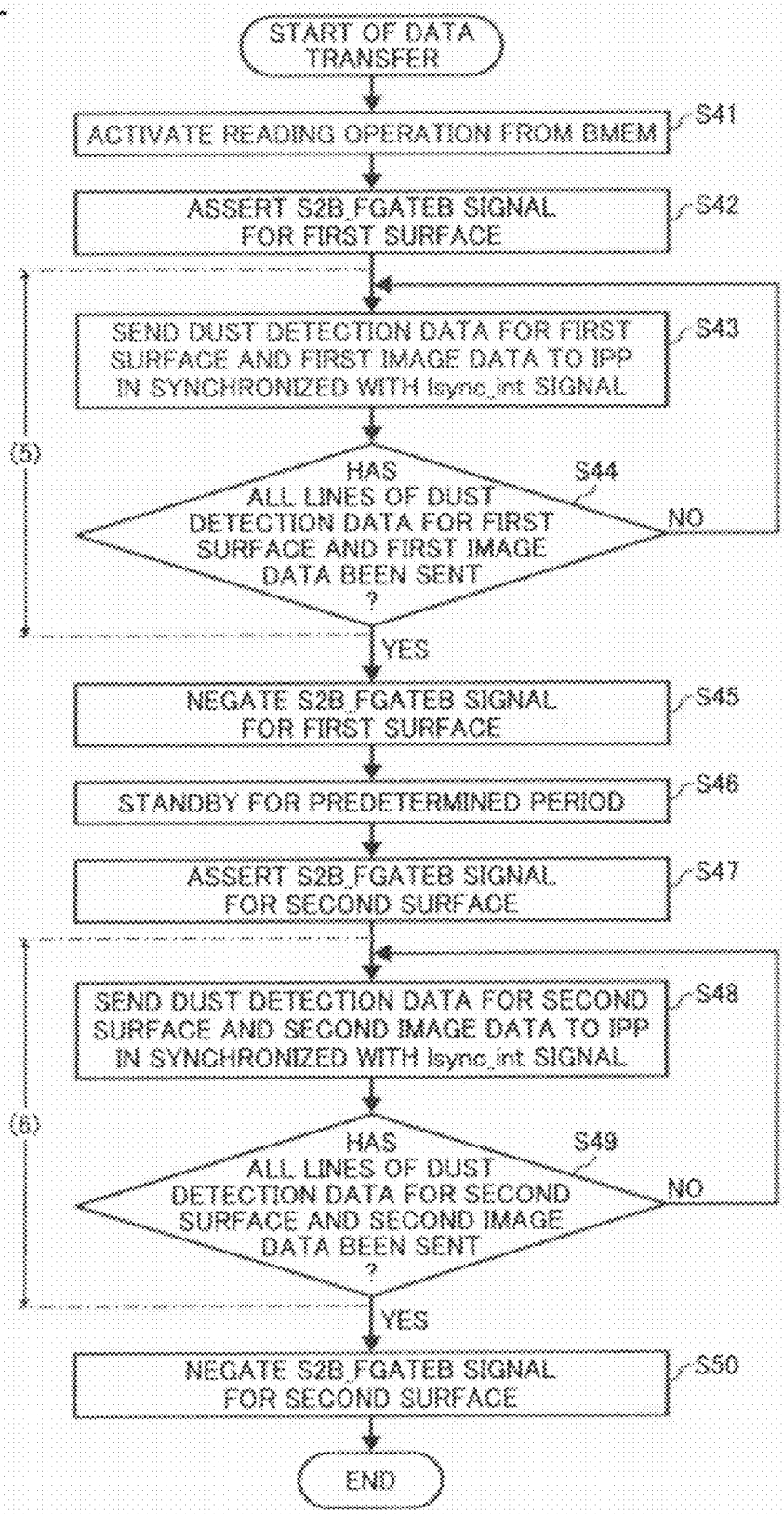
FIG. 22 is a flowchart of a both-surface reading process of reading the dust detection data and the image data from the buffer memory according to the second embodiment.

FIG. 22 is a flowchart of a both-surface reading process of reading the dust detection data and the image data from the buffer memory 6 according to the second embodiment.

The buffer memory controller 5 activates reading operation from the buffer memory 6 (Step S41). The buffer memory controller 5 then asserts the S2B_FGATEB signal of the first-LSYNC control unit 501 (Step S42). The buffer memory controller 5 sends the dust detection data for the front surface and the front image data to the image processing processor 7 in the same manner as Steps S33 and S34 of FIG. 21 (Steps S43 and S44). When the buffer memory controller 5 finishes sending of all lines of the dust detection data for the front surface and the front image data (Yes at Step S44), the buffer memory controller 5 negates the S2B_FGATEB signal for the front surface (Step S45).

After that, the buffer memory controller 5 is on standby for a predetermined period (Step S46). When the predetermined period has passed, the buffer memory controller 5 asserts the S2B_FGATEB signal for the rear surface (Step S47) and sends the dust detection data for the rear surface and the rear image data to the image processing processor 7 in the same manner as Steps S43 and S44 (Steps S48 and S49). When the buffer memory controller 5 finishes sending of all lines of the dust detection data for the rear surface and the rear image data (Yes at Step S49), the buffer memory controller 5 negates the S2B_FGATEB signal for the rear surface (Step S50).

Comparing the both-surface reading process shown in FIG. 22 with the conventional both-surface reading shown in FIG. 44, the buffer memory controller 51 separately controls the reading of the dust detection data for the front surface, the reading of the front image data, the reading of the dust detection data for the rear surface, and the reading of the rear image data in the conventional both-surface reading process, while the buffer memory controller 5 reads the dust detection data for the front surface and the front image data with the non-separated operation at Steps S43 and S44 (see (5)) and reads the dust detection data for the rear surface and the rear image data with the non-separated operation at Steps S48 and S49 (see (6)) in the both-surface reading process according to the second embodiment. In other words, the both-surface reading process according to the second embodiment is simpler than the conventional both-surface reading process.

In this manner, the processes according to the second embodiment are simpler than the conventional processes. Therefore, it is possible to reduce the size of the circuit. Moreover, the dust detection data and the image data are sequentially read without inserting a pause period. Thus, the reading time is shortened, which improves the reading speed.

Figure 23:
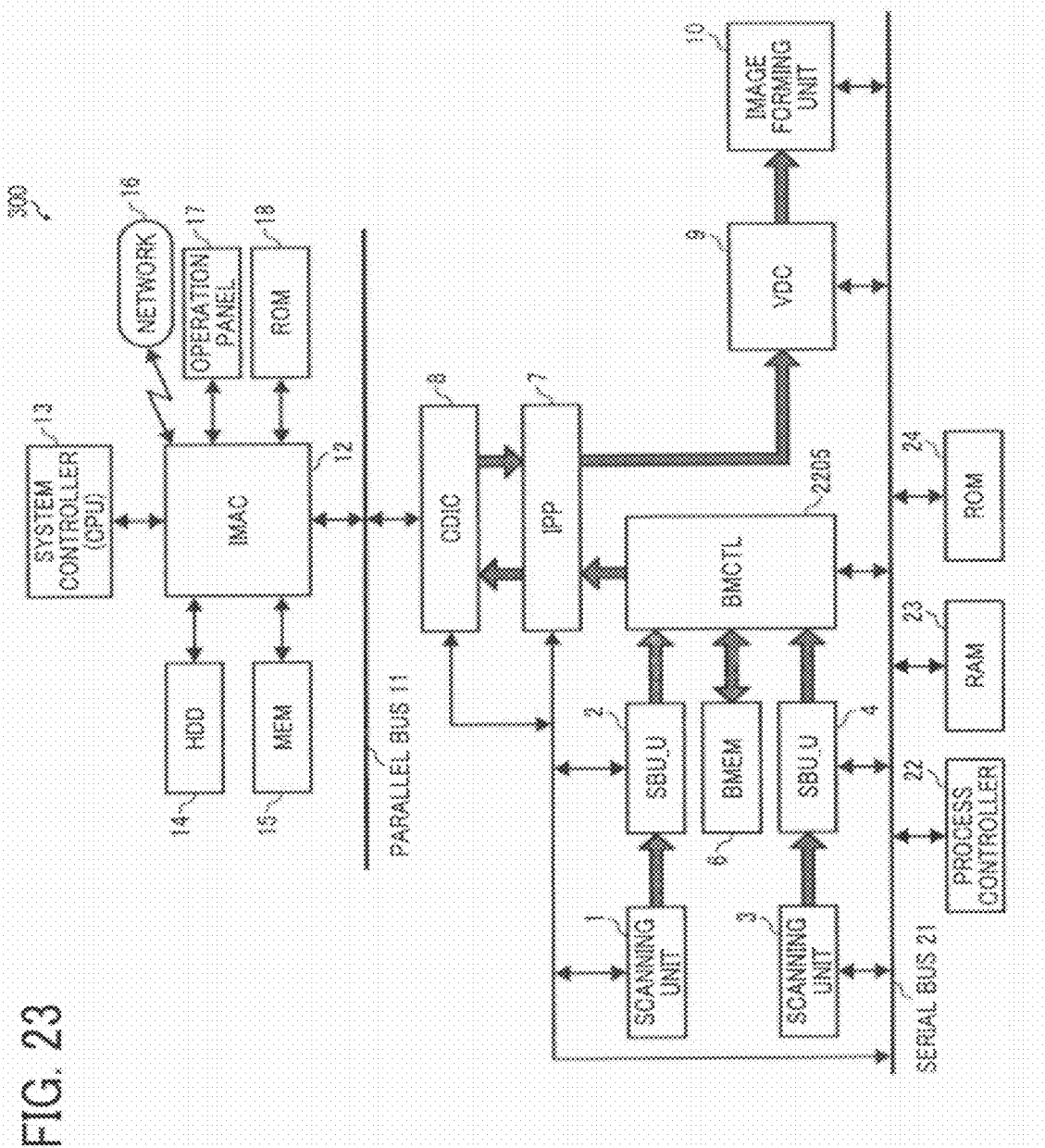
FIG. 23 is a block diagram of an image processing apparatus according to a third embodiment of the present embodiment.

Although the user manually sets one of the skipping modes 0 to 3 in both the first embodiment and the second embodiment, the skipping mode is dynamically adjusted in a third embodiment of the present invention. FIG. 23 is a block diagram of an image processing apparatus 300 according to the third embodiment. Parts corresponding to those in the image processing apparatus 100 shown in FIG. 1 are denoted with the same reference numerals. The structure and function of a buffer memory controller 2205 incorporated in the image processing apparatus 300 is different from the structure and function of the buffer memory controller 5. The structure of a scanner used in the third embodiment is same as the structure of the conventional scanner shown in FIG. 25.

The buffer memory controller 2205 decides one of the skipping modes 0 to 3 based on the resolution for scanning the original. FIG. 24 is a table containing skipping mode and skipping ratio corresponding to scanning resolution. The table is pre-stored in a memory such as a read only memory (ROM) 18.

The buffer memory controller 2205 acquires data indicative of the scanning resolution and decides the skipping mode from among the skipping modes 0 to 3. After that, the buffer memory controller 2205 controls the skipping operation in the same manner as the buffer memory controller 5 controls in the first embodiment and the second embodiment.

In this manner, the skipping mode is dynamically switched among the skipping modes 0 to 3. Thus, the white reference data is skipped in such a manner corresponding to the scanning conditions.

According to an embodiment of the present invention, white reference data is skipped in such a manner one line is remained for every specified number of lines (at a specified skipping ratio), and the white reference data is stored in a buffer memory. The white reference data stored in the buffer memory is used for detecting a dust. Thus, it is possible to reduce a capacity of the buffer memory and thereby reduce the costs, while maintaining the dust detection function.

Moreover, average values of a plurality of lines are stored in the buffer memory as the white reference data. Thus, it is possible to reduce the capacity of the buffer memory and thereby reduce the costs, while maintaining the dust detection function with high accuracy.

Furthermore, a white reference roller that conveys the original is used to generate the white reference data, which reduces the number of parts and thereby reduces the costs. Moreover, the white reference data is scanned while the original is being conveyed. In other words, it is unnecessary to control scanning of the white reference data independently. This simplifies the control system.

Moreover, the user can select whether the white reference data is to be skipped, taking a balance between a total capacity of the white reference data and a capacity of the buffer memory into consideration. Thus, the dust detection function that is optimized from viewpoint of costs is implemented.

Furthermore, the user can select, taking the capacity of the buffer memory into consideration, a skipping ratio of the white reference data, thereby adjusting the total capacity of the white reference data. Thus, the memory capacity is minimized and the dust detection function that is optimized from viewpoint of costs is implemented.

Moreover, it is possible to perform the dust detection only before scanning of the top page of the original, i.e., perform no dust detection before scanning of each subsequent page. Thus, if this mode is selected, the scanning speed is improved.

Furthermore, a controller controls reading of the white reference data and the image data from the buffer memory with a non-separated operation. This simplifies the process control and thereby reduces a size of a circuit for implementing the process control, which reduces the total costs.

Moreover, the buffer memory controller controls storing of the white reference data and the image data in the buffer memory with a non-separated operation. This simplifies the process control and thereby reduces a size of a circuit for implementing the process control, which reduces the total costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for processing an image, comprising:
    a white reference member from which white reference data is obtained;
    an image sensor that reads the white reference member line by line to obtain a plurality of lines of white reference data;
    a skipping unit that skips the white reference data with a predetermined skipping ratio to generate a skipped white reference data;
    a dust detecting unit that detects a dust between the white reference member and the image sensor based on the skipped white reference data; and
    a skipping operation selecting unit that selects whether to operate the skipping unit.

2. The apparatus according to claim 1, wherein the white reference member is a roller arranged in opposite to the image sensor.

3. The apparatus according to claim 1, further comprising:
    a skipping ratio selecting unit that selects the skipping ratio.

4. The apparatus according to claim 1, further comprising:
    a determining unit that determines the skipping ratio based on a reading condition for the original.

5. The apparatus according to claim 4, wherein the reading condition includes a reading resolution.

6. The apparatus according to claim 1, further comprising:
    a dust detection selecting unit that selects whether to operate the dust detecting unit.

7. An apparatus for processing an image, comprising:
    a white reference member from which white reference data is obtained;
    an image sensor that reads the white reference member line by line to obtain a plurality of lines of white reference data;
    a skipping unit that skips the white reference data with a predetermined skipping ratio to generate a skipped white reference data;
    a dust detecting unit that detects a dust between the white reference member and the image sensor based on the skipped white reference data; and
    a calculating unit that calculates an average line data of the lines of white reference data before being skipped, wherein
    the skipping unit leaves the average line data without performing a skipping.

8. A non-transitory computer program product comprising a computer-usable medium having computer-readable program codes embodied in the medium that when executed cause a computer to execute:
    selecting whether to operate a skipping operation;
    reading, by an image sensor, a white reference member line by line and skipping, in accordance with the selecting, a plurality of lines of white reference data obtained from the image sensor by the reading with a predetermined skipping ratio to generate a skipped white reference data; and
    detecting dust between the white reference member and the image sensor based on the skipped white reference data.

9. An apparatus for processing an image, comprising:
    a white reference member from which white reference data is obtained;
    an image sensor that reads the white reference member line by line to obtain a plurality of lines of white reference data;
    a skipping unit that skips the white reference data with a predetermined skipping ratio to generate a skipped white reference data;
    a dust detecting unit that detects a dust between the white reference member and the image sensor based on the skipped white reference data;
    a storage unit; and
    a storage control unit that writes the white reference data obtained from the image sensor by reading the white reference member and image data of the original obtained from the image sensor by reading the original in the storage unit with a pause period intervening.

10. The apparatus according to claim 9, further comprising:
    a synchronization-signal generating unit that generates a series of line synchronization signals; and
    a masking unit that masks the line synchronization signals during the pause period, wherein
    the storage control unit writes the white reference data and the image data in synchronized with unmasked line synchronization signals.

11. A method of processing an image, comprising:
    selecting whether to operate a skipping operation;
    reading, by an image sensor, a white reference member line by line and skipping, in accordance with the selecting, a plurality of lines of white reference data obtained from the image sensor by the reading with a predetermined skipping ratio to generate a skipped white reference data; and
    detecting dust between the white reference member and the image sensor based on the skipped white reference data.

* * * * *